(12) United States Patent
Kadono

(10) Patent No.: US 6,643,414 B1
(45) Date of Patent: Nov. 4, 2003

(54) IMAGE PROCESSING METHOD, IMAGE PROCESSING APPARATUS, AND DATA STORAGE MEDIA

(75) Inventor: Shinya Kadono, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/447,222

(22) Filed: Nov. 23, 1999

(30) Foreign Application Priority Data

Nov. 24, 1998 (JP) .......................... 10-332749

(51) Int. Cl.[7] .................... G06K 9/00; G06K 9/48; G06K 9/36; G06K 9/32
(52) U.S. Cl. .............. 382/291; 382/293; 382/295; 382/243; 382/103; 382/232; 382/199
(58) Field of Search ................. 382/232, 103, 382/233, 199, 235, 236, 243, 253, 276, 277, 278, 282, 287, 291, 293, 295, 298; 375/240.08, 240.1; 348/414.1

(56) References Cited

U.S. PATENT DOCUMENTS

| | | | | | |
|---|---|---|---|---|---|
| 4,091,394 | A | * | 5/1978 | Kashioka et al. | 382/151 |
| 4,435,835 | A | * | 3/1984 | Sakow et al. | 382/151 |
| 5,119,442 | A | * | 6/1992 | Brown | 382/235 |
| 5,748,804 | A | * | 5/1998 | Surka | 382/291 |
| 5,870,094 | A | * | 2/1999 | Deering | 345/419 |
| 5,923,791 | A | * | 7/1999 | Hanna et al. | 382/295 |
| 6,078,700 | A | * | 6/2000 | Sarachik | 382/291 |
| 6,104,840 | A | * | 8/2000 | Ejiri et al. | 382/284 |
| 6,466,701 | B1 | * | 10/2002 | Ejiri et al. | 382/284 |

FOREIGN PATENT DOCUMENTS

JP         10-327410        12/1998

* cited by examiner

Primary Examiner—Andrew W. Johns
Assistant Examiner—Amir Alavi
(74) Attorney, Agent, or Firm—Wenderoth, Lind & Ponack, L.L.P.

(57) ABSTRACT

In an apparatus performing object-by-object coding by using coordinate position information (FMJpos) which indicates the positional relationship between a composite image coordinate system and an object coordinate system, and area position information (OBJpos) which indicates the position of a rectangle area in the object coordinate system, position disturbance information (pos offset) the value of which varies from frame to frame is generated, and the position disturbance information (pos offset) is superposed on the coordinate position information (FMpos) and the area position information (OBJpos) so that the position of the rectangle area corresponding to each object, which position is decided on the composite image coordinate system in accordance with these position information, does not change. Therefore, it is possible to make illegal reuse of an image signal corresponding to each object difficult, without degrading the image quality.

8 Claims, 17 Drawing Sheets

G

B

F1

F2

IMAGE PROCESSING METHOD, IMAGE PROCESSING APPARATUS, AND DATA STORAGE MEDIA

FIELD OF THE INVENTION

The present invention relates to image processing methods, image processing apparatuses, and data storage media and, more particularly, to a coding process for superposing secret information on an image signal corresponding to each object and then coding the image signal. The invention also relates to a decoding process adapted to the coding process.

BACKGROUND OF THE INVENTION

In recent years, we have greeted the age of multimedia in which audio, video, and other data are integrally handled, and the conventional information media, i.e., means for transmitting information to men, such as newspapers, magazines, televisions, radios, and telephones, have been adopted as the targets of multimedia. Generally, "multimedia" means media in which, not only characters, but also diagrams, speeches, and especially images are simultaneously expressed in relation with each other. In order to handle the conventional information media as the targets of multimedia, it is necessary to express the information in digital formats.

When the quantity of data possessed by each of the above-described information media is estimated as the quantity of digital data, in the case of characters, the data quantity per character is only 1~2 byte. However, in the case of speech, the data quantity is 64 kbits per second (quality for telecommunication). Further, in the case of moving picture, the required data quantity is more than 100 Mbits per second (quality for current television broadcasting). So, in the above-described information media, it is not practical to handle such massive data as it is in the digital format. For example, although visual telephones have already been put to practical use by the ISDN (Integrated Services Digital Network) having a transmission rate of 64 kbps~1.5 Mbps, it is impossible to transmit an image from a television camera as it is by the ISDN.

So, data compression techniques are demanded. For example, for visual telephones, the moving picture compression techniques based on the H.261 and H.263 standards which have been standardized by ITU-T (International Telecommunication Union—Telecommunication Sector) are employed. Further, according to the data compression technique based on the MPEG1 standard, it is possible to record image data as well as audio data in an ordinary music CD (compact disk).

The MPEG (Moving Picture Experts Group) is an international standard of data compression for moving pictures, and the MPEG1 is the standard for compressing moving picture data to 1.5 Mbps, i.e., data of a television signal to about 1/100. Since the transmission rate of the targets to which the MPEG1 standard is directed is limited to about 1.5 Mbps, in the MPEG2 which has been standardized to meet the demand for higher image quality, moving picture data is compressed to 2~15 Mbps.

Furthermore, under the existing circumstances, standardization of MPEG4 is now proceeded by the working group for standardization of MPEG1 and MPEG2 (ISO/IEC JTC1/SC29/WG11), and this MPEG4 enables coding and signal processing in object units, and thereby realizes new functions required in the age of multimedia.

The MPEG4 has originally aimed at standardization of coding methods of low bit rates, but the target of standardization is now extended to more versatile coding methods of higher bit rates which are adaptable to an interlace image.

FIGS. 13($a$)–13($d$) are diagrams for explaining the object-by-object coding process.

FIG. 13($a$) shows a composite image G corresponding to one frame in which three objects (i.e., fish, seaweed, and background) are composited.

In the object-by-object coding process, image signals corresponding to the respective objects constituting the composite image G, i.e., the background B (FIG. 13($b$)), the fish F1 as a first foreground (FIG. 13($c$)), and the seaweed F2 as a second foreground (FIG. 13($d$)) are coded individually. Then, coded image signals corresponding to the respective objects are individually transmitted through a transmission medium or recorded in a recording medium.

On the other hand, in the object-by-object decoding process, the coded image signals corresponding to the respective objects are individually received through the transmission medium or reproduced from the recording medium. The coded image signals so obtained are decoded object by object to generate decoded image signals corresponding to the respective objects. Then, the decoded image signals corresponding to the respective objects are composited to obtain a decoded image signal corresponding to the composite image (decoded and reproduced image) G.

In the object-by-object coding process, together with the coded image signals obtained by coding the image signals corresponding to the respective objects, information (scene information) indicating the locations of the respective objects in one frame (display area of the composite image) for compositing the respective objects to be displayed is also transmitted through the transmission medium or recorded on the recording medium.

FIG. 14 is a diagram for specifically explaining information which is used as coding parameters in the object-by-object coding process.

In the object-by-object coding process, the following are coded for transmission or recording: pixel values (image signal) within an object area (hereinafter referred to as a rectangle area (BBOX)) including one object (e.g., the first foreground F1); size information (OBJsize) indicating the size (range) of the rectangle area; area position information (OBJpos) indicating the position of the rectangle area in an object coordinate system (individual coordinate system) corresponding to each object; and coordinate position information (FMpos) indicating the positional relationship between a composite image coordinate system (whole coordinate system) corresponding to a composite image and the object coordinate system corresponding to the object.

The object coordinate system (individual coordinate system) is a coordinate system used for coding of the image signal corresponding to the rectangle area, and it defines a display area corresponding to each object (VOP: Video Object Plane). Further, the composite image coordinate system (whole coordinate system) is a coordinate system used for composition of the respective objects, and it defines a display area (frame) F for displaying the whole composite image. Further, the size information (OBJsize) comprises the width and height of the rectangle area (BBOX). The area position information (OBJpos) is a position vector which indicates the direction and distance of a reference point or of the rectangle area (a point in the upper-left corner of the rectangle area) on the basis of an origin ob of the object coordinate system. The coordinate position information (FMpos) is a position vector which indicates the direction and distance of the origin Ob of the object coordinate system on the basis of an origin Og of the composite image coordinate system.

Since the area position information (OBJpos) is position information in the object coordinate system, it cannot be treated independently of the object-by-object coding process. However, since the coordinate position information (FMpos) is position information in the composite image coordinate system, it can be treated independently of the object-by-object coding process.

The purpose of representing the position of each object (i.e., the rectangle area) by using both of the area position information and the coordinate position information is to enable reuse and control of the object-by-object coded signals, in object units, without decoding the coded signals.

FIG. 15 is a block diagram for explaining the entire structure of a conventional image coding apparatus 200a.

This image coding apparatus 200a encodes, object by object, image signals o1a, o1b, and o1c respectively corresponding to the background B, the first foreground F1, and the second foreground F2 which constitute the composite image G corresponding to one frame (display area of the composite image), and outputs the coded signals.

More specifically, the image coding apparatus 200a includes a first object encoder O1a which encodes the image signal o1a corresponding to the background B and outputs a coded object signal o3a; a second object encoder O1b which encodes the image signal o1b corresponding to the first foreground F1 and outputs a coded object signal o3b; and a third object encoder O1c which encodes the image signal o1c corresponding to the second foreground F2 and outputs a coded object signal o3c. Further, the image coding apparatus 200a includes a scene formation unit S1 and a scene encoder S2. The scene formation unit S1 generates coordinate position information (FMpos) s2 indicating the positional relationship of the object coordinate system to the composite image coordinate system, correspondingly to the scene information s1 relating to the locations of the respective objects in the composite image. The scene encoder S2 compresses the coordinate position information s2 by coding, and outputs the compressed information as a scene signal (coordinate position signal) s3.

Further, the image coding apparatus 200a includes a multiplexer T1 which multiplexes the scene signal s3 and the coded object signals o3a, o3b, and o3c corresponding to the respective objects, and outputs a multiplexed coded signal t1.

In the image coding apparatus 200a so constructed, when the image signals o1a, o1b, and o1c corresponding to the respective objects are input, these image signals o1a~o1c are subjected to coding of pixel values by the corresponding object encoders O1a, O1b, and O1c, respectively, whereby coded object signals o3a, o3b, and o3c corresponding to the respective objects are output from the respective object encoders to the multiplexer T1.

On the other hand, the scene information s1 relating to the locations of the respective objects in the image of one frame (composite image) is input to the scene formation unit S1. In the scene formation unit S1, the coordinate position information (FMpos) s2 indicating the positional relationship of the object coordinate system to the composite image coordinate system is generated in accordance with the scene information s1, and the coordinate position information (FMpos) s2 is output to the scene encoder S2. In the scene formation unit S2, the coordinate position information (FMpos) s2 is compressed by coding, and output as a scene signal s3 to the multiplexer T1.

In the multiplexer T1, the coded object signals o3a~o3c from the respective object encoders O1a~O1c and the scene signal s3 from the scene encoder S2 are multiplexed to be output as a multiplexed coded signal t1.

FIG. 16 is a block diagram illustrating the structure of the conventional object encoder included in the image coding apparatus 200a. Since the respective object encoders O1a~O1c in the image coding apparatus 200a are identical in structure, in the following description for FIG. 16, the object encoders O1a~O1c are described as an object encoder O1, the image signals o1a~o1c are described as an image signal o1, and the coded object signals o3a~o3c are described as a coded object signal o3.

The object encoder O1 includes an area detector 11, an area extractor 12, and an image encoder 13. The area detector 11 detects the position of a rectangle area (BBOX) including an object in the object coordinate system and the size (range) of the rectangle area (BBOX), according to the image signal o1, and outputs area position information (OBJpos) 11a indicating the position of the rectangle area in the object coordinate system, and size information (OBJsize) 11b indicating the range (width and height) of the rectangle area. The area extractor 12 extracts the pixel values of pixels within the rectangle area (BBOX), i.e., the image signal corresponding to the rectangle area, with reference to the area position information 11a and the size information 11b. The image encoder 13 encodes the extracted pixel values to output a coded pixel value signal (coded image signal) 13a.

Furthermore, the object encoder O1 includes a position encoder 14, a size encoder 15, and a multiplexer 16. The position encoder 14 encodes the area position information 11a to output an area position signal 14a. The size encoder 15 encodes the size information 11b to output a size signal 15a. The multiplexer 16 multiplexes the coded image signal 13a from the image encoder 13, the area position signal 14a from the position encoder 14, and the size signal 15a from the size encoder 15, and outputs the multiplexed signal as a coded object signal o3.

In the object encoder O1 so constructed, when the image signal o1 is input, the position and size of the rectangle area (BBOX) including an object in the object coordinate system are detected by the area detector 11, in accordance with the image signal o1, and the area position information (OBJpos) 11a and the size information (OBJsize) 11b are output from the area detector 11. Then, in the area extractor 12, the pixel values in the rectangle area (BBOX) are extracted with reference to the area position information 11a and the size information 11b, and the extracted pixels are encoded in the image encoder 13. At this time, the area position information 11a and the size information 11b are encoded in the position encoder 14 and the size encoder 15, respectively. Then, the outputs from the image encoder 13, the position encoder 14, and the size encoder 15 are multiplexed in the multiplexer 16 to be output as the coded object signal o3.

FIG. 17 is a block diagram for explaining the entire structure of a conventional image decoding apparatus 200b.

This image decoding apparatus 200b decodes the multiplexed coded signal t1 which is output from the image coding apparatus 200a shown in FIG. 15, and generates a composite image signal c1 corresponding to the composite image.

More specifically, the image decoding apparatus 200b includes a demultiplexer T2 and object decoders O2a, O2b, and O2c. The demultiplexer T2 receives the multiplexed coded signal t1 from the image coding apparatus 200a, and separates the multiplexed coded signal t1 into coded object signal o7a, o7b, and o7c corresponding to the above-described coded object signals o3a, o3b, and o3c, respectively, and a scene signal s4 corresponding to the scene signal s3. The object decoders O2a, O2b, and O2c decode the coded object signals o7a, o7b, and o7c to output decoded object signals o9a, o9b, and o9c corresponding to the respective objects. These decoders also output area position information o8a, o8b, and o8c corresponding to the respective objects and equivalent to the above-described area position information (OBJpos) 11a.

Further, the image decoding apparatus 200b includes a scene decoder S3, a display position formation unit S4, and a compositor C1. The scene decoder S3 decodes the scene signal s4 to output coordinate position information s5 equivalent to the above-described coordinate position information (FMpos) s2. The display position formation unit S4 calculates the positions of the rectangle areas corresponding to the respective objects in the composite image coordinate system for composition and display of the respective objects, from the area position information (OBJpos) o8a~o8c and the coordinate position information (FMpos) s5, and outputs display position information s6 indicating the display positions of the respective objects (rectangle areas). The compositor C1 composites the decoded object signals o9a~o9c in accordance with the display position information s6 for the respective objects, and outputs an image signal c1 corresponding to the composite image.

In the image decoding apparatus 200b so constructed, when the multiplexed coded signal t1 from the image coding apparatus 200a is input, the multiplexed coded signal t1 is separated into the coded object in o7a~o7c corresponding to the respective objects and the scene signal s4 in the demultiplexer T2. The demultiplexed coded object signals o7a~o7c are output to the corresponding object decoders O2a~O2c while the scene signal s4 is output to the scene decoder S3.

In the object decoders O2a~O2c, the corresponding coded object signals o7a~o7c are subjected to decoding of pixel values, thereby generating image signals o9a~o9c corresponding to the respective objects (decoded object signals) and area position information o8a~o8c corresponding to the above-described area position information (OBJpos) 11a. The image signals o9a~o9c are output to the compositor C1 while the area position information o8a~o8c are output to the display position formation unit S4.

On the other hand, the scene signal s4 is decoded in the scene decoder S3 to generate coordinate position information s5 corresponding to the above-described coordinate position information (FMpos), and this information s5 is output to the display position formation unit S4.

In the display position formation unit S4, the positions of the respective rectangle areas on the frames for composition and display of the respective objects are calculated from the area position information (OBJpos) o8a~o8c corresponding to the respective objects and the coordinate position information (FMpos) s5, and display position information s6 indicating the display positions of the respective rectangle areas on the frames is output to the compositor C1.

In the compositor C1, the decoded object signals o9a~o9c are composited according to the display position information s6, whereby an image signal c1 corresponding to the composite image is generated.

FIG. 18 is a block diagram for explaining the conventional object decoder included in the image decoding apparatus shown in FIG. 17. Since the respective object decoders O2a~O2c in the image decoding apparatus are identical in structure, in the following description for FIG. 18, the object decoders O2a~O2c are described as an object decoder O2, the coded object signals o7a~o7c are described as a coded object signal o7, and the decoded object signals o9a~o9c are described as a decoded object signal o9.

The object decoder O2 includes a demultiplexer 19, a position decoder 20, and a size decoder 21. The demultiplexer 19 demultiplexes the coded object signal o7 into a coded image signal corresponding to each object (rectangle area), a coded signal corresponding to the area position information (OBJpos) which indicates the position of the rectangle area in the object coordinate system, and a coded signal corresponding to the size information (OBJsize) which indicates the range of the rectangle area. The position decoder 20 decodes the coded signal 19b corresponding to the area position information to output area position information 200. The size decoder 21 decodes the coded signal 19c corresponding to the size information to output size information 201.

The object decoder O2 further includes an image decoder 22 which decodes the coded signal (coded image signal) corresponding to the pixel values of pixels in the rectangle area (BBOX) with reference to the area position information 200 and the size information 201, arid outputs a decoded object signal o9.

In the object decoder O2 so constructed, the input coded object signal o7 is demultiplexed into the coded signals corresponding to the pixel value information, the area position information (OBJpos), and the size information (OBjsize) in the demultiplexer 19. The coded signals corresponding to the area position information and the size information are decoded in the position decoder 20 and the size decoder 21 to be output as the area position information 200 and the size information 201, respectively. At this time, the area position information 200 is output as the area position information o8 to the outside. Further, in the image decoder 22, the coded image signal corresponding to the rectangle area (BBOX) is decoded with reference to the area position information 200 and the size information 201, and a decoded object signal o9 is output.

When the object encoder O1 shown in FIG. 16 is constructed so that the image encoder 13 performs inter-frame coding which uses pixel correlation between frames, the object encoder O1 can perform coding at a higher compression ratio. When the object encoder O1 is so constructed, the object decoder O2 shown in FIG. 18 is constructed so that the image decoder 22 performs inter-frame decoding, whereby the object decoder O2 can correctly decode the coded signal supplied from the object encoder O1 performing inter-frame coding.

Hereinafter, a description will be given of specific structures of an object encoder performing inter-frame coding and an object decoder performing inter-frame decoding.

FIG. 19 is a block diagram illustrating an object encoder O1a performing inter-frame coding.

The object encoder O1a shown in FIG. 19 includes an image decoder 32 and a memory 30 in addition to the constituents of the object encoder O1 shown in FIG. 18. The image decoder 32 decodes the coded signal 13a output from the image encoder 13, in accordance with the area position information 11a and the size information 11b from the area detector 11, with reference to an image signal 30a of a previous frame which has already been decoded. The memory 30 stores a decoded image signal 32a output from the image decoder 32. Further, in the object encoder O1a, the image encoder 13 performs inter-frame coding, that is, it encodes difference values between the pixel values from the area extractor 12 and the pixel values (image signal 30a) of the previous frame which have already been decoded and stored in the memory 30.

Since the position of the rectangle area BBOX corresponding to each object varies from frame to frame, the area position information 11a is input to the memory 30, whereby the memory 30 can read and write the already decoded image signal (reference image) in the object coordinate system.

FIG. 20 is a block diagram illustrating the structure of an object decoder O2a having an image decoder performing interframe decoding.

The object decoder O2a shown in FIG. 20 includes a memory 31 for storing a decoded image signal 22a output from the image decoder 22, in addition to the constructions of the object decoder O2 shown in FIG. 18. Further, in the object decoder O2a, the image decoder 22 decodes the coded image signal 19a output from the demultiplexer 19, in accordance with the area position information 200 and the size information 201, and adds the decoded image signal to the image information 31a of the previous frame which has already been decoded and stored in the memory 31, thereby restoring the image signal.

Further, in the object decoder O2a, as in the object encoder O1a shown in FIG. 19, the position information 200 is input to the memory 31, whereby the memory can read and write the already decoded image signal (reference image signal) in the object coordinate system.

The object decoder O2a so constructed can correctly decode the coded signal which is output from the object encoder O1a performing inter-frame coding.

By the way, the above-described method of coding an image signal in object units has the advantage that the image signal can be reused for each object independently. However, on the other hand, it has the risk that the image signal corresponding to each object is illegally reused.

So, in the case where the use of each object or the content as each object is that for which illegal use of the coded image signal corresponding to each object or reuse of the coded image signal in object units is to be inhibited, it is necessary to introduce means for deciding, when the image signal of each object is reused, as to whether the use of the image signal is legal or not (to be specific, embedding secret information such as copyright information relating to the object into the image signal corresponding to the object), or means for making reuse of the image in object units difficult.

As for the conventional object-by-object image coding method, no study has been conducted with respect to such illegal reuse of an image signal corresponding to each object, and it is the utmost to assume a method of embedding secrete information such as copyright information in the pixel values of the image signal, as a countermeasure against the illegal reuse. The method of embedding secrete information in the pixel values is a technique which has been developed for the conventional frame-by-frame coding method, and it may well be possible to apply this method to the object-by-object coding method by adding some technical modifications.

However, the method of embedding information in the pixel values is disadvantageous in that the embedding and extracting processes are complicated and, moreover, the image quality degrades because the pixel values are intentionally distorted.

SUMMARY OF THE INVENTION

The present invention is made to solve the above-described problems and has for its object to provide a method and an apparatus for image processing which can realize a coding process that makes it difficult to illegally reuse an image signal corresponding to each object, without degrading the image quality, by a relatively simple construction, and a method and an apparatus for image processing which can correctly decode a coded image signal obtained by the above-mentioned coding process, and furthermore, a data storage medium which contains a program for implementing the coding process and the decoding process by using a computer.

It is another object of the present invention to provide a method and an apparatus for image processing which can realize a coding process in which secrete information can be added to a coded image signal to be output, without degrading the image quality, and a method and an apparatus for image processing which can correctly decode the coded image signal obtained by the coding process, and furthermore, a data storage medium which contains a program for implementing the coding process and the decoding process by using a computer.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image processing method for coding an image signal to display a predetermined composite image which comprises plural objects, the coding being performed for each of object areas which include the respective objects constituting the composite image. This method comprises the steps of: adding position disturbance information for disturbing the position of each object area, to area position information which indicates the position of the object area in an individual coordinate system for processing the image signal of the object area, thereby generating disturbed area information, and subjecting the image signal corresponding to the object area to a coding process based on the individual coordinate system, in accordance with the area position information or the disturbed area information, thereby generating a coded image signal corresponding to the object area; multiplexing a disturbed area signal obtained by coding the disturbed area information and the coded image signal corresponding to each object area, and outputting the multiplexed signal as a coded object signal for each object; adding the position disturbance information to coordinate position information which indicates the positional relationship between a whole coordinate system for displaying the whole composite image and the individual coordinate system corresponding to each object area, such that the position of each object area, which moves on the individual coordinate system in accordance with the position disturbance information, becomes unchangeable on the whole coordinate system in spite of the position disturbance information, thereby generating disturbed coordinate information; and multiplexing a disturbed coordinate signal obtained by coding the disturbed coordinate information arid the coded object signals corresponding to the respective objects to output a multiplexed coded signal. Therefore, even when the coded signal corresponding to each object is decoded, only the position of the object area disturbed by the position disturbance information is obtained, and the correct display position of the rectangle area in the whole coordinate system and the individual coordinate system cannot be obtained, thereby making illegal reuse of the image information of each object difficult. Further, since the position disturbance information is embedded, not in the pixel values corresponding to the rectangle area of each object, but in the area position information indicating the position of the rectangle area of each object, unwanted degradation of image quality of each object can be avoided.

According to a second aspect of the present invention, there is provided an image processing method for decoding the multiplexed coded signal obtained by the image processing method of the first aspect. This method comprises the steps of: separating the multiplexed coded signal into the disturbed coordinate signal and the coded object signals corresponding to the respective objects, and separating each of the coded object signals into the disturbed area signal and the coded image signal; decoding the disturbed area signal and the disturbed coordinate signal to generate the disturbed area information and the disturbed coordinate information, respectively; subjecting the coded image signal corresponding to each object area to a decoding process based on the individual coordinate system, in accordance with the disturbed area information, thereby generating a decoded image signal corresponding to each object area; and subjecting the decoded image signals corresponding to the respective object areas to a composition process based on the whole coordinate system, in accordance with the disturbed coordinate information and the disturbed area information corresponding to the respective object areas, thereby generating the image signal corresponding to the composite image comprising the respective objects. Therefore, the correct display position of the rectangle area of each object can be obtained in the whole coordinate in accordance with the coded object signal on which the position disturbance signal is superposed, whereby the image signal corresponding to the composite image can be correctly reproduced.

According to a third aspect of the present invention, in the image processing method of the first aspect, the position disturbance information is generated so that it includes specific information which is input from the outside, in accordance with the specific information. Therefore, the specific information can be embedded in the area position information corresponding to the object, whereby secret information or the like can be transmitted as the specific information, without degrading the image quality.

According to a fourth aspect of the present invention, there is provided an image processing method for decoding the multiplexed coded signal obtained by the image processing method of the third aspect. This method comprises the steps of: separating the multiplexed coded signal into the disturbed coordinate signal and the coded object signals corresponding to the respective objects, and separating each of the coded object signal into the disturbed area signal and the coded image signal; decoding the disturbed area signal and the disturbed coordinate signal to generate the disturbed area information and the disturbed coordinate information, respectively; subjecting the coded image signal corresponding to each object area to a decoding process based on the individual coordinate system, in accordance with the disturbed area information, thereby generating a decoded image signal corresponding to each object area; subjecting the decoded image signals corresponding to the respective object areas to a composition process based on the whole coordinate system, in accordance with the disturbed coordinate information and the disturbed area information corresponding to the respective object areas, thereby generating the image signal corresponding to the composite image comprising the respective objects; and extracting the specific information included in the position disturbance information, in accordance with the disturbed area information, and outputting the extracted specific information. Therefore, the correct display position of the rectangle area of each object can be obtained in the whole coordinate in accordance with the coded object signal on which the position disturbance signal is superposed, whereby the image signal corresponding to the composite image can be correctly reproduced. In addition, secret information or the like can be obtained from the coded object signal.

According to a fifth aspect of the present invention, there is provided an image processing method for coding an image signal to display a predetermined composite image which comprises plural objects, the coding being performed for each of object areas including the respective objects constituting the composite image. This method comprises the steps of: adding range enlargement information indicating the scale of enlargement for the range of each object area, to area range information which indicates the range of each object area in an individual coordinate system for processing the image signal corresponding to the object area, thereby generating enlarged area information; subjecting the image signal corresponding to the object area the range of which has been enlarged according to the scale of enlargement, to a coding process based on the individual coordinate system, in accordance with area position information indicating the position of the object area in the individual coordinate system, thereby generating a coded image signal corresponding to each object area; multiplexing an area position signal obtained by coding the area position information, an enlarged area signal obtained by coding the enlarged area information, and the coded image signal corresponding to each object area, and outputting the multiplexed signal as a coded object signal for each object; and multiplexing a coordinate position signal which is obtained by coding coordinate position information indicating the positional relationship between a whole coordinate system for displaying the whole composite image and the individual coordinate system corresponding to each object area, and the coded object signals corresponding to the respective objects, and outputting a multiplexed coded signal. Therefore, specific information can be embedded in the area range information corresponding to the object by superposing the specific information on the range enlargement information, whereby secret information or the like can be transmitted as the specific information without degrading the image quality.

According to a sixth aspect of the present invention, there is provided an image processing method for decoding the multiplexed coded signal obtained by the image processing method of the fifth aspect. This method comprises the steps of: separating the multiplexed coded signal into the coordinate position signal and the coded object signals corresponding to the respective objects, and separating each of the coded object signals into the area position signal, the enlarged area signal, and the coded image signal; decoding the coordinate position signal, the area position signal, and the enlarged area signal to generate the coordinate position information, the area position information, and the enlarged area information, respectively; subjecting the coded image signal corresponding to each object area to a decoding process based on the individual coordinate system, in accordance with the area position information and the enlarged area information, thereby generating a decoded image signal corresponding to each object area; subjecting the decoded image signals corresponding to the respective object areas to a composition process based on the whole coordinate system, in accordance with the coordinate position information and the area position information corresponding to the respective object areas, thereby generating the image signal corresponding to the composite image comprising the respective objects; and extracting the specific information embedded in the range enlargement information, in accordance with the enlarge area information, and outputting the extracted specific information. Therefore, secret information or the like can be obtained from the coded object signal.

According to a seventh aspect of the present invention, there is provided an image processing apparatus for coding an image signal to display a predetermined composite image which comprises plural objects, the coding being performed for each of object areas including the respective objects constituting the composite image. This apparatus comprises: a disturbance information generation unit for generating position disturbance information for disturbing the position of each object area in an individual coordinate system for processing the image signal of the object area; an area shifting unit for subjecting the image signal corresponding to each object area to an area shifting process by which the position of each object area in each individual coordinate system is shifted according to the position disturbance information, thereby generating an area-shifted image signal; an area detection unit for detecting disturbed area information which indicates the position or the object area in each individual coordinate system, in accordance with the area-shifted image signal corresponding to each object area; an image coding unit for subjecting the area shifted image signal corresponding to each object area to a coding process based on the individual coordinate system, in accordance with the disturbed area information, thereby generating a coded image signal corresponding to each object area; a multiplexer for multiplexing a disturbed area signal obtained by coding the disturbed area information and the coded image signal corresponding to each object area, and outputting the multiplexed signal as a coded object signal for each object; a coordinate information generation unit for adding the position disturbance information to coordinate position information which indicates the positional relationship between a whole coordinate system for displaying the whole composite image and the individual coordinate system corresponding to each object area, such that the position of each object area, which changes on the individual coordinate system in accordance with the position disturbance information, becomes unchangeable on the whole coordinate system in spite of the position disturbance information, thereby generating disturbed coordinate information; and a multiplexing unit for multiplexing a disturbed coordinate signal obtained by coding the disturbed coordinate information and the coded object signals corresponding to the respective objects, and outputting a multiplexed coded signal. Therefore, even when the area-sifted image signal is reproduced by a decoding process for each object, only the position of the object area disturbed by the position disturbance information is obtained, and the correct display position of the rectangle area in the whole coordinate system and the individual coordinate system cannot be obtained, thereby making illegal reuse of the image information of each object difficult. Further, since the image signal corresponding to each object area is subjected to the above-described area shifting process, unwanted degradation of image quality of each object can be avoided. Furthermore, it is possible to make illegal reuse of the image information of each object difficult by a relatively simple alteration of circuit, i.e., by adding only the disturbance information generation unit and the area shifting unit, thereby providing a coding apparatus of high practicality.

According to an eighth aspect of the present invention, there is provided an image processing apparatus for coding an image signal to display a predetermined composite image which comprises plural objects, the coding being performed for each of object areas including the respective objects constituting the composite image. This apparatus comprises: a disturbance information generation unit for generating position disturbance information for disturbing the position of each object area on an individual coordinate system for processing the image signal of each object area; an area detection unit for detecting area position information which indicates the position of each object area on each individual coordinate system, in accordance with the image signal corresponding to each object area; an area information processing unit for adding the position disturbance information to the area position information, thereby generating disturbed area information; an image coding unit for subjecting the image signal corresponding to each object area to a coding process based on the individual coordinate system, in accordance with the area position information, thereby generating a coded image signal corresponding to each object area; a multiplexer for multiplexing a disturbed area signal obtained by coding the disturbed area information and the coded image signal corresponding to each object area, and outputting a coded object signal for each object; a coordinate information processing unit for adding the position disturbance information to coordinate position information which indicates the positional relationship between a whole coordinate system for displaying the whole composite image and the individual coordinate system corresponding to each object area, such that the position of each object area, which changes on the individual coordinate system in accordance with the position disturbance information, becomes unchangeable on the whole coordinate system in spite of the position disturbance information, thereby generating disturbed coordinate information; and a multiplexing unit for multiplexing a disturbed coordinate signal obtained by coding the disturbed coordinate information and the coded object signals corresponding to the respective objects, and outputting a multiplexed coded signal. Therefore, even when the coded image signal corresponding to each object is decoded, only the position of the object area disturbed by the position disturbance information is obtained, and the correct display position of the rectangle area in the whole coordinate system and the individual coordinate system cannot be obtained, thereby making illegal reuse of the image information of each object difficult. Further, since the position disturbance information is added to the area position information indicating the position of the rectangle area of each object, unwanted degradation of image quality of each object can be avoided.

According to a ninth aspect of the present invention, there is provided an image processing apparatus for decoding the multiplexed coded signal output from the image processing apparatus according to the seventh or eighth aspect. This apparatus comprises: a demultiplexing unit for separating the multiplexed coded signal into the disturbed coordinate signal and the coded object signals corresponding to the respective objects; a demultiplexer for separating each of the coded object signals into the disturbed area signal and the coded image signal; an information decoding unit for decoding the disturbed area signal and the disturbed coordinate signal to generate the disturbed area information and the disturbed coordinate information, respectively; an image decoding unit for subjecting the coded image signal corresponding to each object area to a decoding process based on the individual coordinate system, in accordance with the disturbed area information, thereby generating a decoded image signal corresponding to each object area; and a composition unit for subjecting the decoded image signals corresponding to the respective object areas to a composition process based on the whole coordinate system, in accordance with the disturbed coordinate information and the disturbed area information corresponding to the respective object areas, thereby generating the image signal corresponding to the composite image comprising the respective objects. Therefore, the correct display position of the rectangle area of each object can be obtained in the whole coordinate system in accordance with the coded object signal on which the position disturbance information is superposed, whereby the image signal corresponding to the composite image can be correctly reproduced.

According to a tenth aspect of the present invention, in the image processing apparatus of the eighth aspect, the disturbance information generation unit generates the position disturbance information so that specific information supplied from the outside is included in the position disturbance information, in accordance with the specific information. Therefore, the specific information can be embedded in the area position information corresponding to the object, whereby secret information or the like can be transmitted as the specific information without degrading the image quality.

According to an eleventh aspect of the present invention, there is provided an image processing apparatus for decoding the multiplexed coded signal output from the image processing apparatus of the tenth aspect. This apparatus comprises: a demultiplexing unit for separating the multiplexed coded signal into the disturbed coordinate signal and the coded object signals corresponding to the respective objects; a demultiplexer for separating each of the coded object signals into the disturbed area signal and the coded image signal; an information decoding unit for decoding the disturbed area signal and the disturbed coordinate signal to generate the disturbed area information and the disturbed coordinate information, respectively; an image decoding unit for subjecting the coded image signal corresponding to each object area to a decoding process based on the individual coordinate system, in accordance with the disturbed area information, thereby generating a decoded image signal corresponding to each object area; a composition unit for subjecting the decoded image signals corresponding to the respective object areas to a composition process based on the whole coordinate system, in accordance with the disturbed coordinate information and the disturbed area information corresponding to the respective object areas, thereby generating an image signal corresponding to the composite image comprising the respective objects; and an information extraction unit for extracting the specific information embedded in the position disturbance information, in accordance with the disturbed area information, and outputting the extracted specific information. Therefore, the correct display position of the rectangle area of each object can be obtained in the whole coordinate system in accordance with the coded object signal on which the position disturbance information is superposed, whereby the image signal corresponding to the composite image can be correctly reproduced. In addition, secret information or the like can be obtained from the coded object signal.

According to a twelfth aspect of the present invention, there is provided an image processing apparatus for coding an image signal to display a predetermined composite image which comprises plural objects, the coding being performed for each of object areas including the respective objects constituting the composite image. This apparatus comprises: an area detection unit for detecting area position information which indicates the position of each object area on an individual coordinate system for processing the image signal of the object area, and area size information which indicates the range of the object area, in accordance with the image signal corresponding to each object area; an enlargement information generation unit for generating enlargement information for enlarging the range of the object area on each individual coordinate system; an information processing unit for converting the area size information to enlarged sized information which indicates the range obtained by enlarging the range of the object area by a scale according to the enlargement information; an image coding unit for subjecting the image signal corresponding to each object area to a coding process based on the individual coordinate system, in accordance with the area position information and the enlarged size information, thereby generating a coded image signal corresponding to each object area; a multiplexer for multiplexing an area position signal obtained by coding the area position information, an enlarged size signal obtained by coding the enlarged size information, and the coded image signal corresponding to each object area, thereby outputting a coded object signal for each object; and a multiplexing unit for multiplexing a coordinate position signal obtained by coding the coordinate position information which indicates the positional relationship between a whole coordinate system for displaying the whole composite image and the individual coordinate system corresponding to each object area, and the coded object signals corresponding to the respective objects, and outputting a multiplexed coded signal. Therefore, specific information can be embedded in the size information corresponding to each object by superposing the specific information on the enlargement information, whereby secret information or the like can be transmitted as the specific information without degrading the image quality.

According to a thirteenth aspect of the present invention, there is provided an image processing apparatus for decoding the multiplexed coded signal obtained by the image processing apparatus of the twelfth aspect. This apparatus comprises: a demultiplexing unit for separating the multiplexed coded signal into the coordinate position signal and the coded object signals corresponding to the respective objects; a demultiplexer for separating each of the coded object signals into the area position signal, the enlarged size signal, and the coded image signal; a decoding unit for decoding the area position signal, the enlarged size signal, and the coordinate position signal to generate the area position information, the enlarged size information, and the coordinate position information, respectively; an image decoding unit for subjecting the coded image signal corresponding to each object area to a decoding process based on the individual coordinate system, in accordance with the area position information and the enlarged size information, thereby generating a decoded image signal corresponding to each object area; a composition unit for subjecting the decoded image signals corresponding to the respective object areas to a composition process based on the whole coordinate system, in accordance with the coordinate position information and the area position information corresponding to the respective object areas, thereby generating the image signal corresponding to the composite image comprising the respective objects; and an information extraction unit for extracting the specific information embedded in the enlargement information, in accordance with the enlarged size information, and outputting the extracted specific information. Therefore, the coded object signal on which the enlargement information is superposed can be correctly decoded and, moreover, secret information or the like can be obtained from the coded object signal According to a fourteenth aspect of the present invention, there is provided a data storage medium containing an image processing program, wherein the image processing program is a coding program for making a computer perform an image signal coding process according to the image processing method of the first or third aspect.

According to a fifteenth aspect of the present invention, there is provided a data storage medium containing an image processing program, wherein the image processing program is a decoding program for making a computer perform a coded image signal decoding process according to the image processing method of the second or fourth aspect.

According to a sixteenth aspect of the present invention, there is provided a data storage medium containing an image processing program, wherein the image processing program is a coding program for making a computer perform an image signal coding process according to the image processing method of the fifth aspect.

According to a seventeenth aspect of the present invention, there is provided a data storage medium containing an image processing program, wherein the image processing program is a decoding program for making a computer perform a coded image signal decoding process according to the image processing method of the sixth aspect.

BRIEF DESCRIPTION OF THE DRAWINGS

FIGS. 13(a)–13(d) are schematic diagrams for explaining a conventional block-by-block coding process, wherein FIG. 13(a) shows a composite image, FIG. 13(b) shows a background image, and FIGS. 13(c) and 13(d) show first and second foreground images.

DETAILED DESCRIPTION OF THE PREFERRED EMBODIMENTS

Hereinafter, the inventor's viewpoint and the fundamental principle of the present invention will be described.

Figure 1:
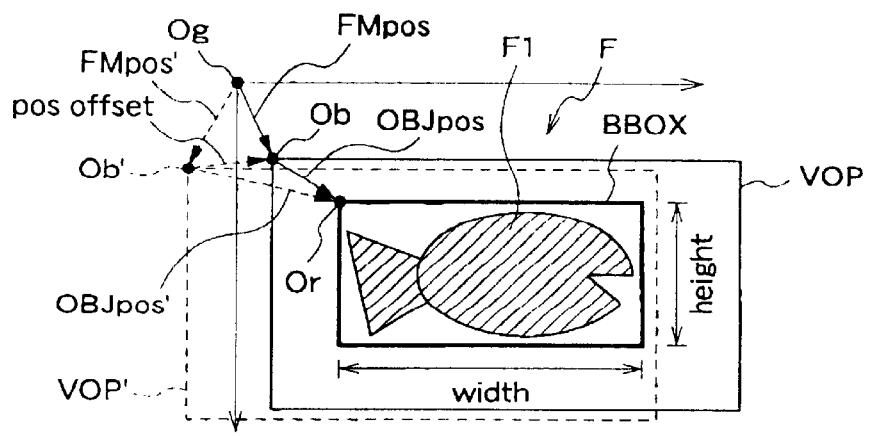
FIG. 1 is a schematic diagram for explaining the fundamental principle of the present invention.

FIG. 1 is a schematic diagram for explaining the fundamental principle of an image processing method according to the present invention.

FIG. 1 shows the positional relationship between a composite image coordinate system (whole coordinate system) and an object coordinate system (individual coordinate system) which are used for a coding process in the image processing method of the present invention.

The composite image coordinate system is a coordinate system for performing composition of the respective objects, and it defines a display area (frame) for displaying a composite image. The object coordinate system is a coordinate system for performing coding on a rectangle area corresponding to each object, and it defines a display area (VOP) for displaying the rectangle area of the object.

In the coding process, the positional relationship between the origin Og of the composite image coordinate system and the origin Ob of the object coordinate system is set according to coordinate position information (FMpos), and the position of a reference point of a rectangle area (BBOX) with respect to the origin Ob of the object coordinate system (in FIG. 1, the point in the upper-left corner of the rectangle area) is set according to area position information (OBJpos).

So, the inventors of the present invention have noticed that two coordinate systems, i.e., the object coordinate system (individual coordinate system) and the composite image coordinate system (whole coordinate system), are used to define the position of a rectangle area (BBOX) corresponding to each object in the display area of the composite image, and discovered the fundamental principle of the present invention.

The fundamental principle is as follows. In the object-by-object coding process, predetermined information (pos offset) is superposed on the coordinate position information (FMpos) and the area position information (OBJpos) so that the position of a rectangle area (BBOX) corresponding to each object, which position is decided in the display area of the composite image in accordance with these position information, does not change, whereby it is made difficult to independently reuse a decoded signal corresponding to each object and, moreover, secrete information can be embedded in the predetermined information (pos offset) for transmission.

To be specific, the coordinate position information (FMpos) is a position vector which indicates the position of the origin Ob of the object coordinate system with respect to the origin Og of the composite image coordinate system (whole coordinate system), and the area position information (OBJpos) is a position vector which indicates the position of the reference point Or of the rectangle area BBOX (in FIG. 1, the point in the upper-left corner of the rectangle area) with respect to the origin Ob of the object coordinate system (individual coordinate system). Further, the predetermined information (pos offset) is a position vector which indicates the positional relationship between the origin Ob' of a disturbed object coordinate system (disturbed individual coordinate system) and the origin Ob of the object coordinate system (individual coordinate system).

In the present invention, position disturbance information (position vector) for disturbing the position of the rectangle area in the object coordinate system is superposed as the predetermined information (pos offset) on the coordinate position information (FMpos) to generate disturbed area information (FMpos') as represented by the following formula (1). Further, the position disturbance information for disturbing the position of the rectangle area in the object coordinate system is superposed as the predetermined information (pos offset) on the area position information (OBJpos) to generate disturbed area information (OBJpos') as represented by the following formula (2).

FMpos'=FMpos−pos offset (1)

OBJpos'=OBJpos+pos offset (2)

Figure 13:
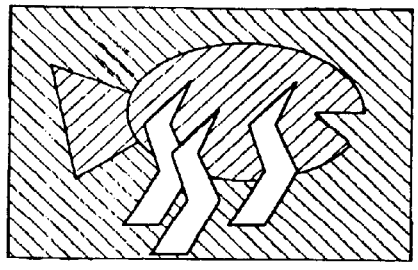
Figure 13:
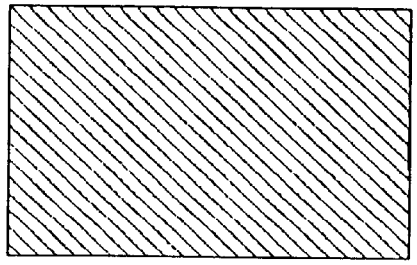
Figure 13:
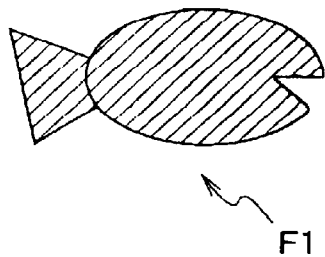
Figure 13:
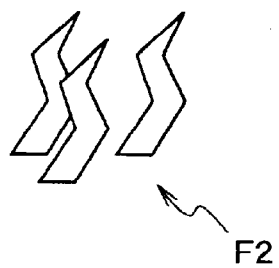
Figure 14:
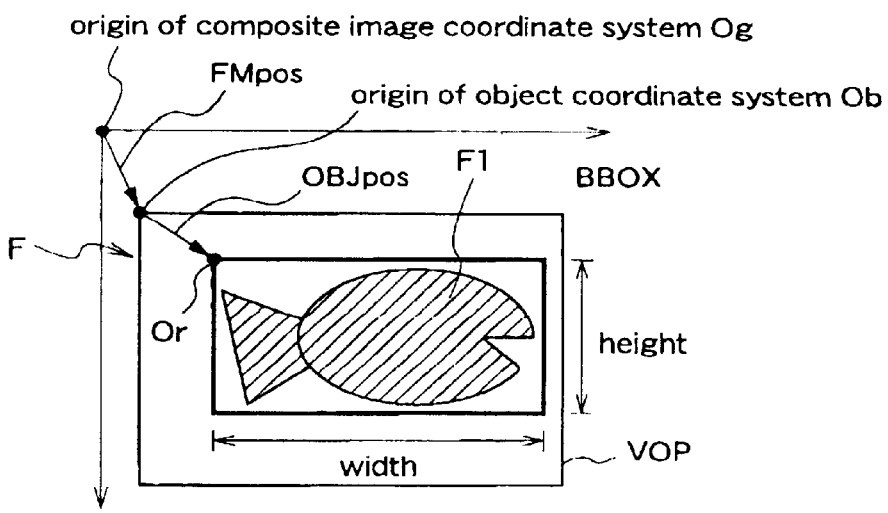
FIG. 14 is a diagram for explaining coding parameters which are used for the conventional block-by-block coding process.
Figure 15:
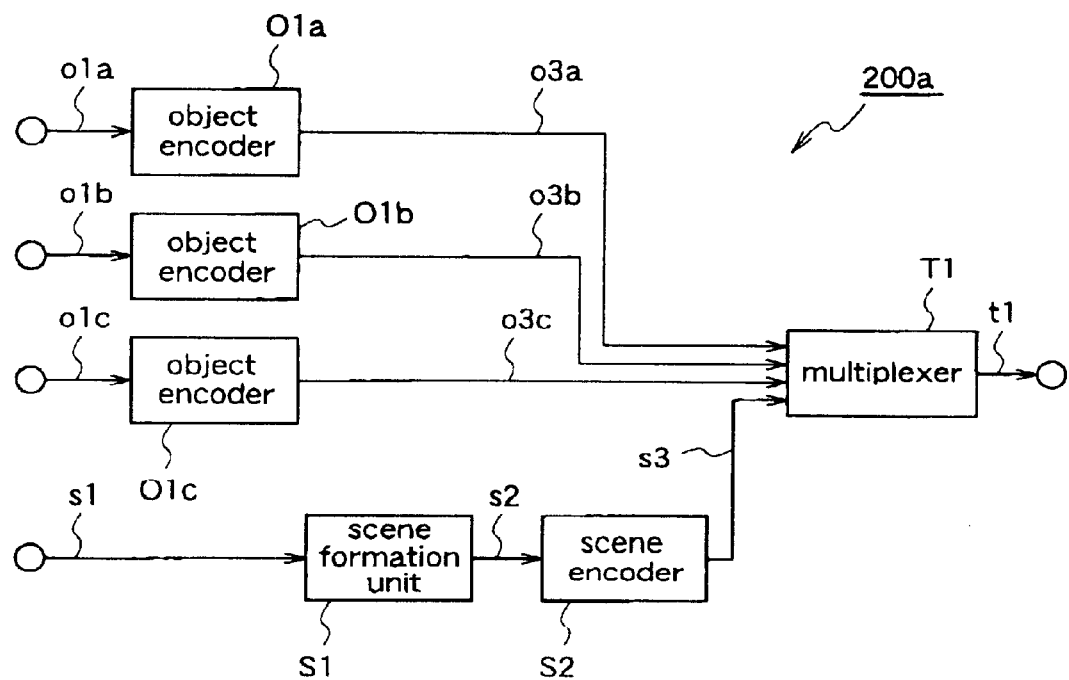
FIG. 15 is a block diagram for explaining a conventional image coding apparatus.

Although in FIG. 1 only the first foreground F1 is shown in the frame F which is the display area of the composite image, when the composite image is composed of three objects like the composite image G shown in FIG. 13, object coordinate systems (object display areas) corresponding to the background B and the second foreground F2 are also positioned in the frame F, besides the object coordinate system (object display area) corresponding to the first foreground F1.

In the image processing method of the present invention, to be specific, the disturbed coordinate information (FMpos') and the distrubed area information (OBJpos'), on which the position disturbance information (pos offset) is superposed, are encoded instead of the coordinate position information (FMpos) and the area position information (OBJpos), and the coded signals corresponding to the respective coded information are transmitted together with the coded image signal corresponding to the rectangle area of each object.

In this image processing method, the position where the rectangle area (BBOX) corresponding to each object is actually displayed in the display area of the composite image, is the position specified by the position vector (FMpos'+OBJpos'), and this position vector is represented by FMpos'+OBJpos'=(FMpos−pos offset)+(OBJpos+pos offset)=FMpos+OBJpos. Therefore, regardless of the value of the position vector (pos offset), the rectangle area corresponding to each object is displayed in the position where it ought to be displayed, in the display area of the composite image.

This means that, even though the position vector (pos offset) is changed in the above-described image processing method, the coded image signal corresponding to the composite image obtained by this image processing method can be correctly decoded by the conventional image decoding method.

On the other hand, by changing the position vector (pos offset) in frame units, the position of the rectangle area (BBOX) is disturbed by this position vector (pos offset) in the object display area VOP'. Therefore, even when someone tries extracting the coded image signal corresponding to each object to reuse it, the object displayed by the decoded image signal obtained by decoding this coded image signal behaves unnaturally on the display area VOP', and this makes illegal reuse of the coded image signal in object units difficult.

Further, the value of the area position information (OBJpos') is set at an arbitrary value by setting the value of the position vector (pos offset) at an arbitrary value and, therefore, secrete information can be superposed on the area position information (OBJpos') by embedding it in the position disturbance information (pos offset). Further, by superposing the secret information on the area position information (OBJpos'), not directly, but after being subjected to signal processing such as encryption and error correction, the secret information becomes hard to decrypt.

[Embodiment 1]

Figure 2:
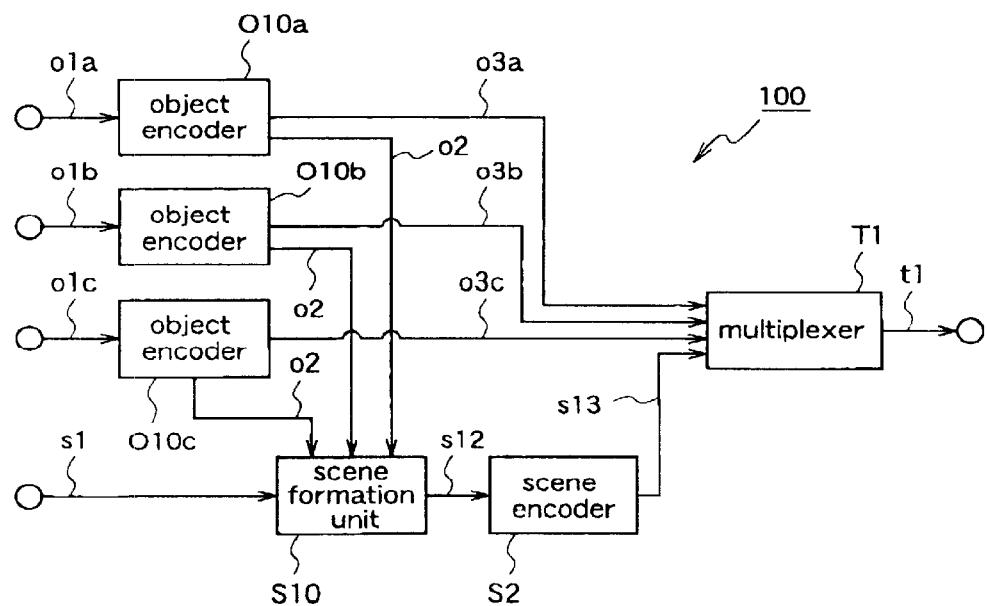
FIG. 2 is a block diagram for explaining an image coding apparatus according to a first embodiment of the invention.

FIG. 2 is a block diagram for explaining an image coding apparatus 100 as an image processing apparatus according to a first embodiment of the present invention.

The image coding apparatus 100 of this first embodiment includes object encoders O10a, O10b, and O10c which output position disturbance information (pos offset) o2 as well as coded image signals o3a, o3b, and o3c, instead of the object encoders O1a, O1b, and O1c of the conventional image coding apparatus 200a.

The image coding apparatus 100 further includes a scene formation unit S10, instead of the scene formation unit S1 of the conventional image coding apparatus 200a. The scene formation unit S10 outputs disturbed coordinate information (FMpos') s12 obtained by superposing the position disturbance information (pos offset) o2 on the coordinate position information (FMpos) s1, in accordance with information s1 relating to the arrangement of the respective objects on one frame. This disturbed coordinate information (FMpos') s12 is encoded by the scene encoder S2 and output as a disturbed coordinate signal (scene signal) s3 to the multiplexer T1.

The disturbed coordinate information (FMpos') is obtained by subtracting the position vector as the position disturbance information (pos offset) o2 from the position vector as the coordinate position information (FMpos).

Other constituents of the image coding apparatus 100 are identical to those of the conventional image coding apparatus 200a.

Figure 3:
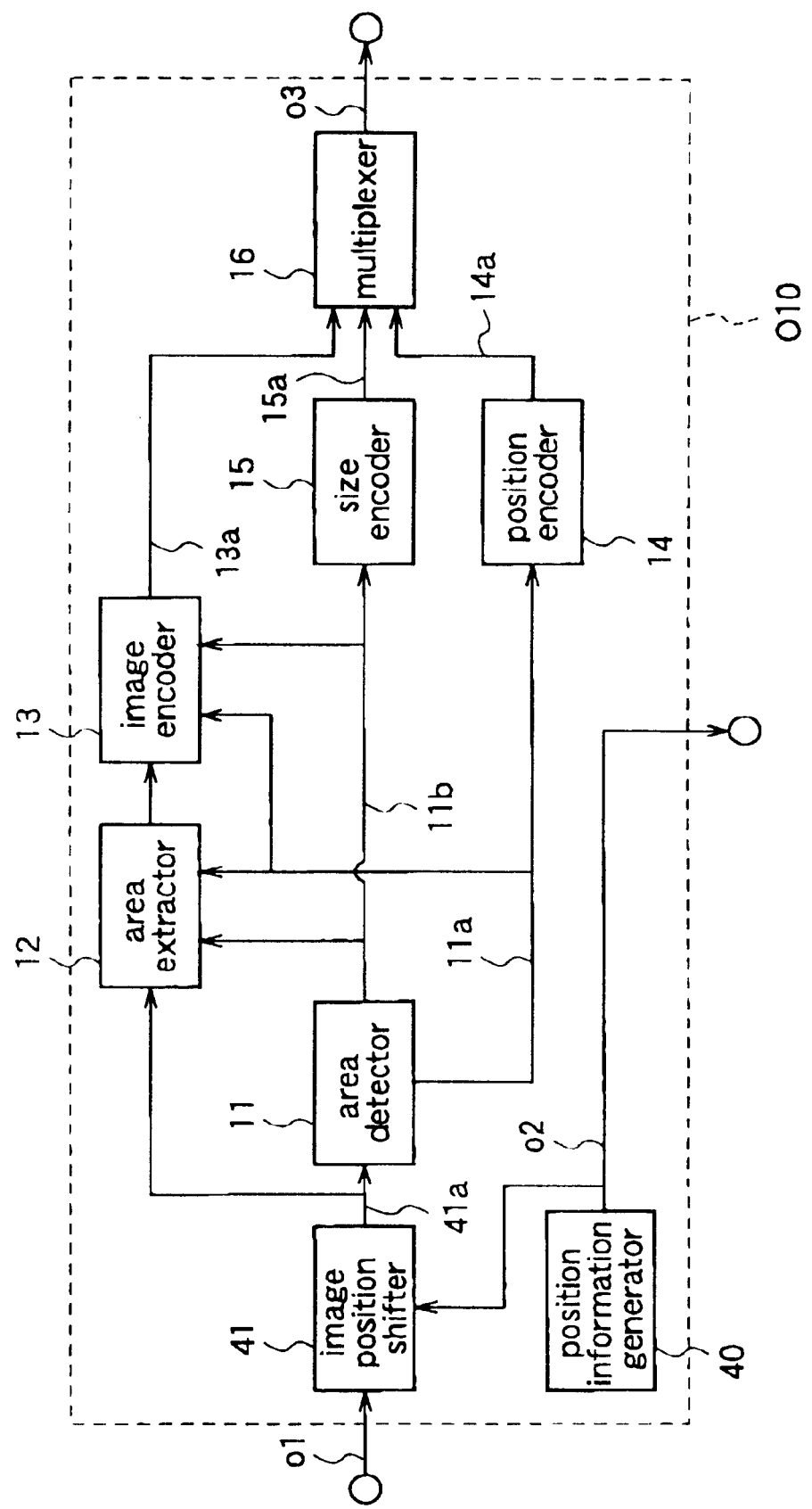
FIG. 3 is a block diagram for explaining a first object encoder which is a constituent of the image coding apparatus of the first embodiment.

FIG. 3 is a block diagram for explaining the object encoders constituting the image coding apparatus 100. Since the respective object encoders O10a~O10c of the image coding apparatus 100 have the same structure, in the description for FIG. 3, the object encoders O10a~O10c are described as an object encoder O10. Further, the image signals o1a~o1c are described as an image signal o1, and the coded object signals o3a~o3c are described as a coded object signal o3.

The object encoder O10 according to this first embodiment includes a position information generator 40, in addition to the constituents of the conventional object encoder O1. The position information generator 40 generates, as the position disturbance information (pos offset), position information o2 for changing the coordinate position information (FMpos) and the area position information (OBJpos). This position information o2 is output to the scene formation unit S10. Further, the position information generator 40 changes the value of the position information o2, frame by frame, on the basis of a table of random numbers, a predetermined table, or a specific function. The The object encoder O10 further includes an image position shifter 41. The image position shifter 41 subjects the input image signal o1 corresponding to each object to an image shifting process based on the position information (pos offset) o2, by which the area position information (OBJpos) indicating the position of the rectangle area (BBOX) in the object coordinate system becomes the disturbed area information (OBJpos'=OBJpos+pos offset), and outputs an image-shifted image signal 41a.

The object encoder O10 performs area detection by the area detector 11 and area detection by the area detector 12, in accordance with the image-shifted image signal 41a.

Other constituents of the object encoder O10 are identical to those of the conventional object encoder O1.

Next, the operation of the image coding apparatus 100 will be described.

When the image signals o1a~o1c corresponding to the respective objects constituting the image on the frame, and the scene information s1 indicating the positional relationship of the respective objects on the frame, are input to the image coding apparatus 100, the respective image signals o1a~o1c are encoded by the corresponding object encoders O10a~O10c.

More specifically, in the position information generator 40 in each of the object encoders O10a~O10c, a position vector as the position information (pos offset) o2 is generated on the oasis of a table of random numbers, a predetermined table, or a specific function. Further, in the image position shifter 41, the input image signal o1 is subjected to a shifting process by which, in the object coordinate system, the rectangle area of the corresponding object is shifted in a direction and by a distance which are based on the position vector o2, and an image-shifted image signal 41a is output from the shifter 41.

Thereafter, in the area detector 11, the disturbed area information (OBJpos') 11a indicating the position of the rectangle area of each object in the object coordinate system is detected in accordance with the image-shifted image signal 41a and, further, the size information (OBjsize) 11b indicating the range of the rectangle area is detected. The disturbed area information 11a and the size information 11b are encoded in the position encoder 14 and the size encoder 15 to be output as a disturbed area signal 14a and a size signal 15a, respectively.

In this first embodiment, the position of the rectangle area of the object corresponding to the image signal input to the area detector 11 has previously been shifted by a degree equivalent to the position disturbance information (pos offset) in the object coordinate system. Therefore, the position information 11a detected by the area detector 11 is not the area position information (OBJpos) obtained from the image signal before being subjected to the shifting process but the disturbed area information (OBJpos') which is obtained by adding the position information (pos offset) to the area position information (OBJpos).

Further, in the area extractor 12, the pixel values of pixels in the rectangle area corresponding to each object (the image signal corresponding to the rectangle area) are extracted in accordance with the image-shifted image signal 41a. In the image encoder 13, these pixel values are subjected to a coding process based on the object coordinate system in which the position or its origin Ob' is decided according to the disturbed area information (OBJpos'), and a coded image signal 13a corresponding to each rectangle area is output from the image encoder 13.

Then, the coded image signal 13a, the disturbed area signal 14a, and the size signal 15a are multiplexed by the multiplier 16 to be output as a coded object signal o3 corresponding to each object.

As for the coded object signals o3a~o3c output from the object encoders O10a~O10c, the coded image signal corresponding to each rectangle area is, as shown in FIG. 1, obtained by coding the image signal corresponding to the rectangle area (BBOX) of each object, on the basis of the origin Ob' of the object coordinate system corresponding to the object display area (VOP') which is obtained by shifting the object coordinate system corresponding to the object display area (VOP) by a degree equivalent to the position information.

Further, the position vector o2 as the position information (pos offset) is output to the scene formation unit S10. Thereby, the scene formation unit S10 is informed that the image signal o1 corresponding to each rectangle area is encoded on the basis of the object coordinate system which is obtained by shifting the object coordinate system based on the signal o1 by a degree equivalent to the position information (pos offset).

As the result of the coding processes performed by the object encoders O10a~O10c, the respective object encoders O10a~O10c output the coded image signals o3a~o3c of the corresponding objects, and the position information (pos offset) o2 for changing the position of the rectangle area of each object in the object coordinate system.

On the other hand, the scene information s1 is input to the scene formation unit S10. In the scene formation unit S10, the position information o2 is superposed on the coordinate position information (FMpos) which is obtained from the scene information s1, and disturbed coordinate information (FMpos') s12 is output. This disturbed coordinate information (FMpos') s12 is encoded in the scene encoder s2 to be output as a scene signal (disturbed coordinate system) s3.

Then, the coded image signals o3a~o3c output from the object encoders O10a~O10c and the scene signal s3 output from the scene encoder S2 are multiplexed in the multiplier T1 to be output as a multiplexed coded signal t1.

As described above, the image processing apparatus according to the first embodiment performs object-by-object coding by using the coordinate position information (FMpos) indicating the positional relationship between the display area of a composite image (composite image coordinate system) and the display area of an object (object coordinate system), and the area position information (OBJpos) indicating the position of a rectangle area in the display area of the object. This apparatus is provided with the position information generator 40 which generates the position disturbance information o2 the value of which varies from frame to frame, and the position disturbance information (pos offset) is superposed on the coordinate position information (FMpos) and the area position information (OBJpos) so that the position of the rectangle area corresponding to each object, which position is decided in the display area of the composite image in accordance with these position information, does not change. Therefore, it is possible to make reuse of the decoded signal of each object difficult, without degrading the image quality.

More specifically, even when the coded image signal o3 corresponding to each object is decoded, only the disturbed area information (OBJpos') which has been disturbed by the position information is obtained, and the disturbed coordinate information (FMpos') which has been disturbed by the position information cannot be obtained. Therefore, the correct display position of the rectangle area cannot be obtained in the composite image coordinate system and the object coordinate system, thereby making illegal reuse of the image information of each object difficult.

Further, in the image coding apparatus, it is possible to make illegal reuse of the image information of each object difficult by a relatively simple alteration in the circuit structure, i.e., by only adding the disturbance information generator 40 which generates the position disturbance information and the image position shifter 41 which subject the image signal corresponding to each object area to an area shifting process, thereby providing a coding apparatus of high practicality.

Figure 17:
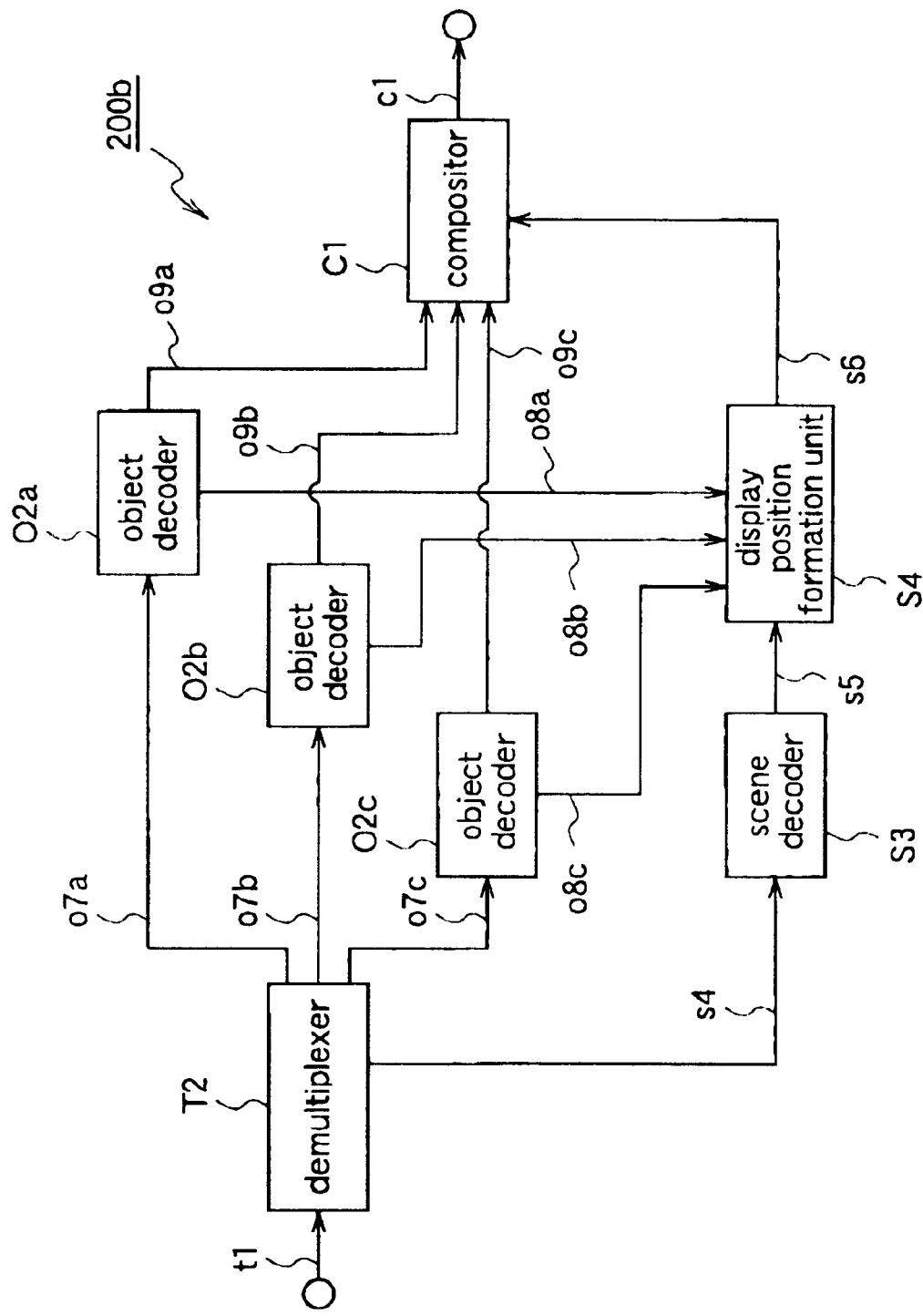
FIG. 17 is a block diagram for explaining a conventional image decoding apparatus.

Further, the multiplexed coded signal output from the image coding apparatus of this first embodiment can be correctly decoded by an image decoding apparatus of the same structure as the conventional image decoding apparatus 200b shown in FIG. 17.

Furthermore, when the image encoder 13 included in any of the object encoders O10a~O10c is constituted so as to perform inter-frame coding utilizing the pixel correlation between frames, the image encoder 13 can perform coding at a higher compression ratio and, moreover, it is possible to make illegal reuse of the image information of each object more difficult.

[Modification of Embodiment 1]

Figure 4:
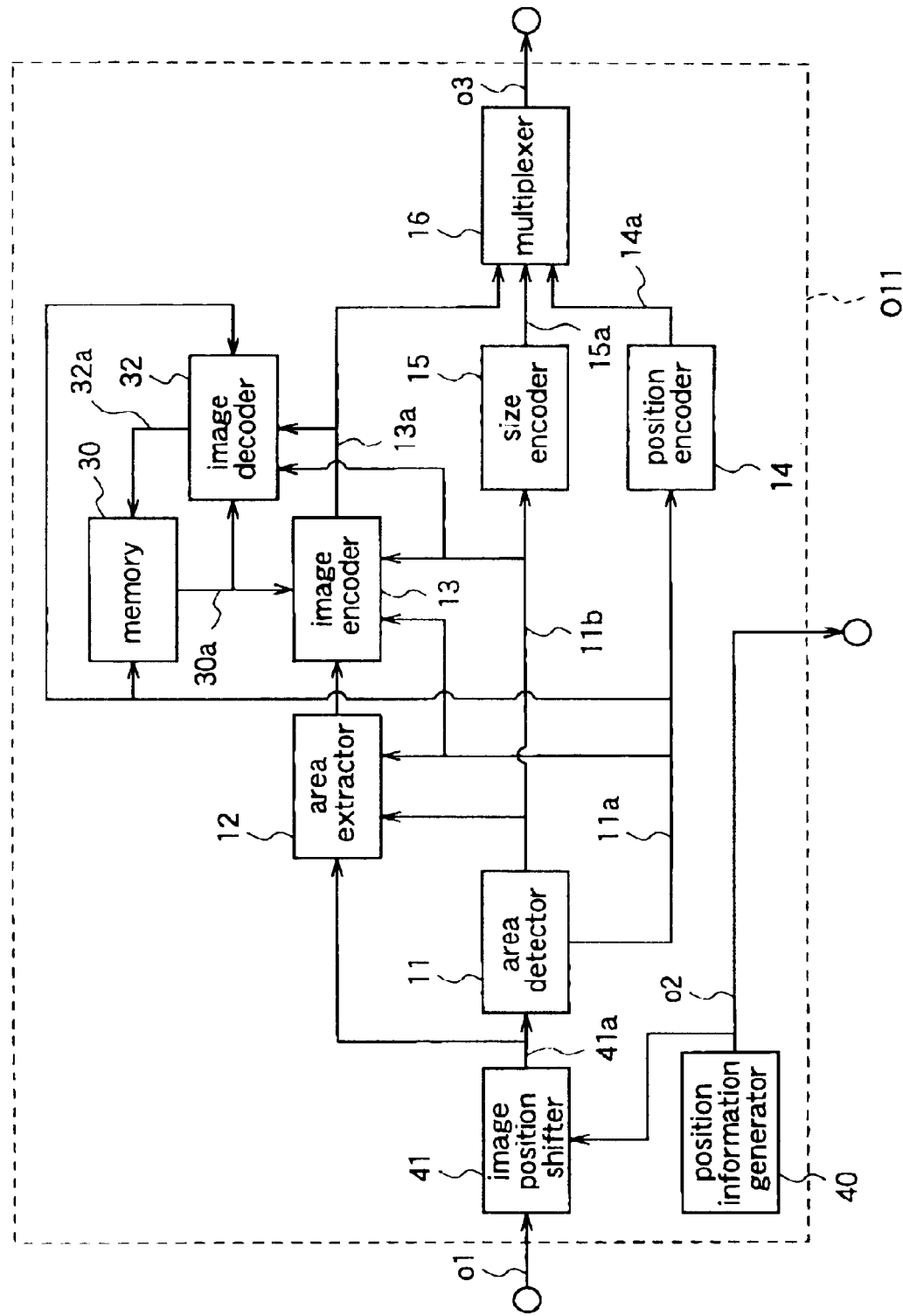
FIG. 4 is a block diagram for explaining an image coding apparatus according to a modification of the first embodiment, illustrating an object encoder which is a constituent of the image coding apparatus.

FIG. 4 is a block diagram for explaining an image coding apparatus according to a modification of the first embodiment, and illustrating an object encoder as a constituent of the image coding apparatus.

The image coding apparatus according to this modification of the first embodiment includes an object encoder O11 which performs an inter-frame coding process utilizing the pixel correlation as a coding process for the image signal corresponding to each object, instead of each of the object encoders O10a~O10c included in the image coding apparatus 100 of the first embodiment The object encoder O11 includes an image decoder 32 and a memory 30 in addition to the constituents of the object encoder O10 of the first embodiment shown in FIG. 3. The image decoder 32 decodes the coded signal output from the image encoder 13, according to the area position information 11a and the size information 11b which are output from the area detector 11, with reference to an image signal 30a of a previous frame which has already been decoded. The memory 30 stores a decoded image signal 32a output from the image decoder 32, in accordance with the position information 11b. Further, in the object encoder O11, the image encoder 13 performs inter-frame coding, i.e., it encodes difference values between the pixel values (image signal) corresponding to the rectangle area extracted by the area extractor 12 and the pixel values of a previous frame which have already been decoded and stored in the memory 30.

In the modification of the first embodiment so constructed, the value of the position information o2 for moving the rectangle area on the object coordinate system is changed frame by frame, and the image signal corresponding to the rectangle area of each object in the frame to be processed is encoded with reference to the image signal of the rectangle area corresponding to the previous frame. Therefore, even when a portion of the coded image signal corresponding to each object (a moving picture) can be extracted from the multiplexed coded signal corresponding to the composite image and decoded, it is very difficult to display the image of the object which moves normally.

Figure 20:
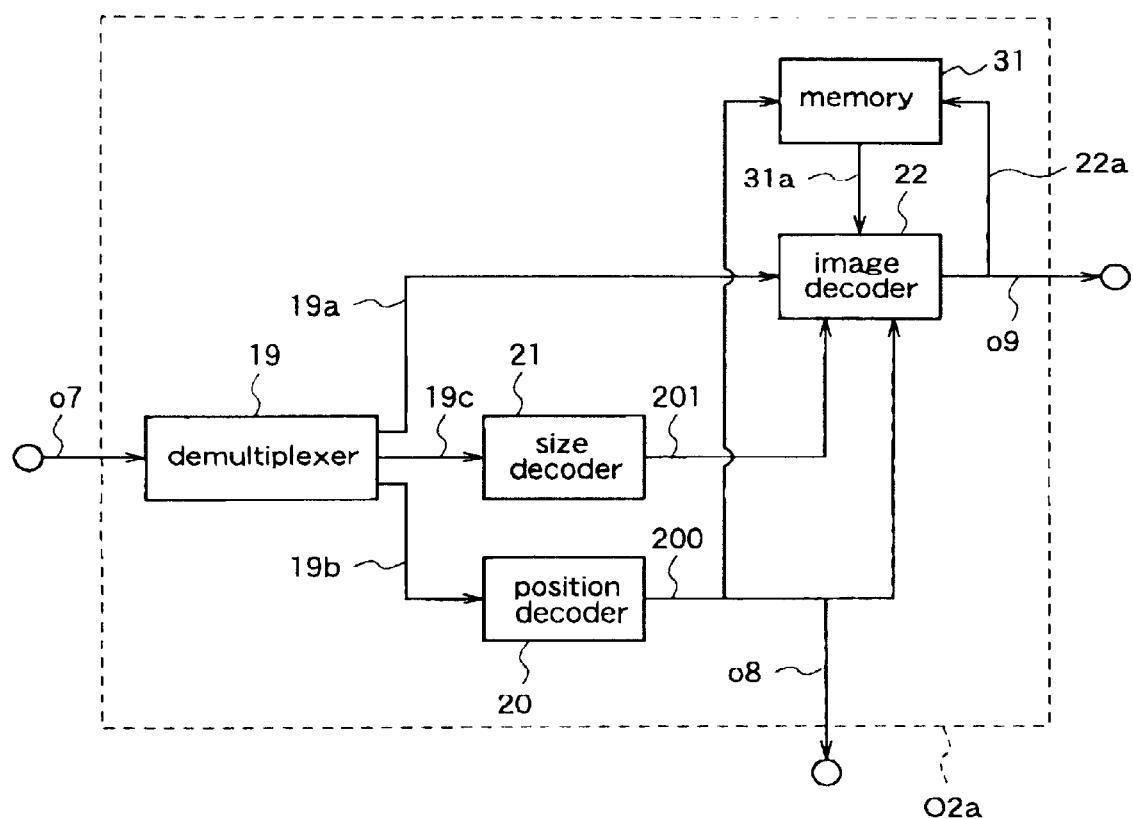
FIG. 20 is a block diagram illustrating other constituents of the conventional object decoder.

Further, the multiplexed coded signal output from the image coding apparatus according to this modification of the first embodiment can be correctly decoded by an image decoding apparatus of the same structure as the conventional image decoding apparatus 200 which employs the object decoder O2a shown in FIG. 20.

[Embodiment 2]

Figure 5:
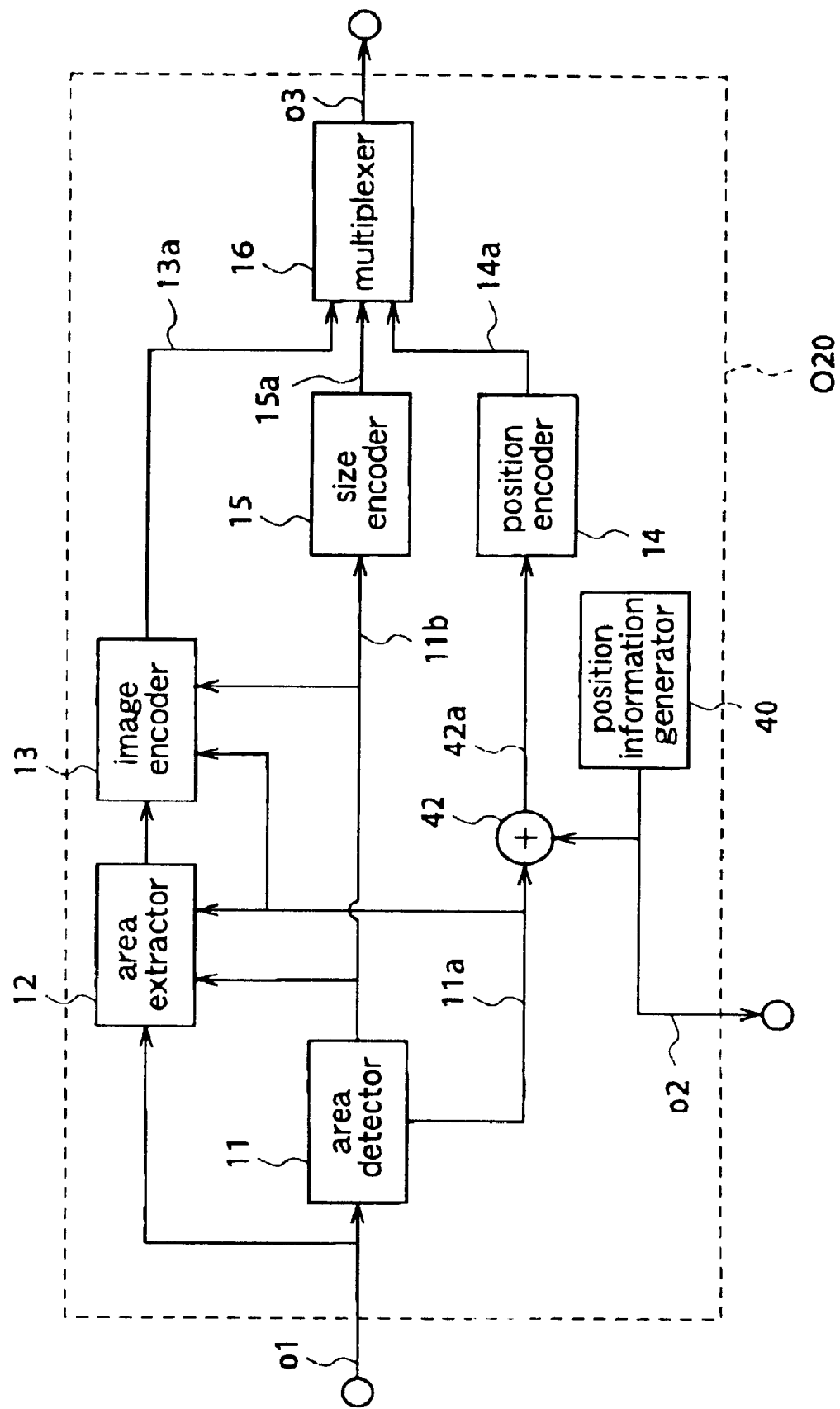
FIG. 5 is a block diagram for explaining an image coding apparatus according to second embodiment of the invention, illustrating an object encoder which is a constituent of the image coding apparatus.

FIG. 5 is a block diagram for explaining an image coding apparatus according to a second embodiment of the present invention, illustrating an object encoder O20 as a constituent of the image coding apparatus.

The object encoder O20 according to this second embodiment has a position information generator 40, in addition to the constituents of the object encoder O1 which is included in the conventional image coding apparatus 200a. The position information generator 40 generates position information o2 as the above-described position disturbance information (pos offset), and this position information o2 is output to the scene formation unit S10. Further, the object encoder O20 has an adder 42 which adds the position information (pos offset) directly to the position information (OBJpos) 11a which is output from the area detector 11, and the output 42a from the adder 42 is encoded as disturbed area information (OBJpos') in the position encoder 14.

In the object encoder O20 so constructed, the output 42a from the adder 42 is disturbed area information (OBJpos'= OBJpos+pos offset) which is obtained by adding the position information (pus offset) to the area position information (OBJpos) which indicates the position of the rectangle area (BBOX) in the object coordinate system.

Therefore, in this second embodiment, as in the object encoder O10 of the first embodiment, the coded object signal o3 corresponding to each object is obtained by coding the image signal corresponding to the rectangle area (BBOX) of each object, on the basis of the origin Ob' of the object coordinate system corresponding to the object display area (VOP') which is obtained by shifting the object coordinate system corresponding to the object display area (VOP) by a degree equivalent to the above-described position information, as shown in FIG. 1.

As the result, also in this second embodiment, as in the first embodiment, when the coded image signal o3 corresponding to each object is decoded, only the disturbed area information (OBJpos') on which the position information o2 is superposed is obtained, but the disturbed coordinate information (FMpos') on which the position information o2 is superposed cannot be obtained. Hence, the correct display position of the rectangle area cannot be obtained in the composite image coordinate system and the object coordinate system, thereby making illegal reuse of the image information of each object difficult.

Further, the multiplexed coded signal output from the image coding apparatus of this second embodiment can be correctly decoded by an image decoding apparatus of the same structure as the conventional image decoding apparatus 200b shown in FIG. 17.

Also in this second embodiment, when the image encoder 13 included in the object encoder O20 is constructed so as to perform inter-frame coding utilizing the pixel correlation between frames, the image encoder 13 can perform coding at a higher compression ratio, and moreover, it is possible to make illegal reuse of the image information of each object more difficult.

[Modification of Embodiment 2]

Figure 6:
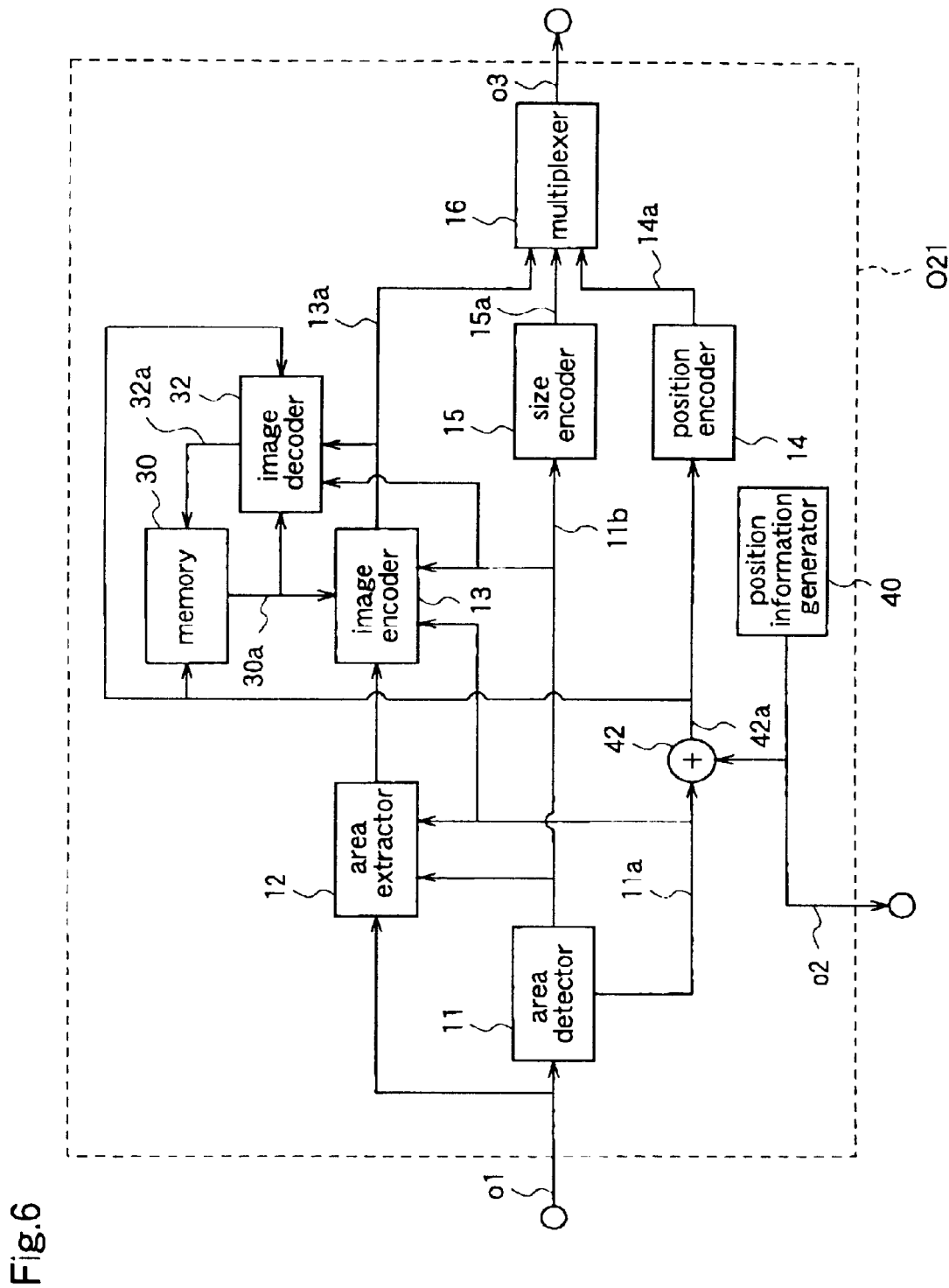
FIG. 6 is a block diagram for explaining an image coding apparatus according to a modification of the second embodiment, illustrating an object encoder which is a constituent of the image coding apparatus.

FIG. 6 is a block diagram for explaining an image coding apparatus according to a modification of the second embodiment, illustrating an object encoder which is a constituent of the image coding apparatus.

The image coding apparatus according to this modification of the second embodiment is provided with an object encoder O21 which performs an inter-frame coding process utilizing pixel correlation, as a coding process for the image signal corresponding to each object, instead of the object encoder O20 included in the image coding apparatus of the second embodiment.

The object encoder O21 includes an image decoder 32 and a memory 30 in addition to the constituents of the object encoder O20 of the second embodiment shown in FIG. 5. The image decoder 32 decodes the coded signal output from the image encoder 13, in accordance with the size information 11b and the disturbed position information 42a which is obtained by superposing the position information o2 on the position information 11a from the area detector 11, with reference to then image signal 30a of the previous frame which has already been decoded. The memory 30 stores the decoded image signal 32a output from the image decoder 32, in accordance with the disturbed position information 42a. Further, in the object encoder O21, the image encoder 13 performs an inter-frame coding process for coding difference values between the pixel values (image signal) corresponding to the rectangle area extracted by the area extractor 12 and the pixel values of the previous frame which have already been decoded and stored in the memory 30.

The reason why the disturbed position information 42a is input to the memory 30 is because, in this modification of the second embodiment, the image signal o1 is encoded as it is, and the area position information indicating the position of the rectangle area in the object coordinate system is converted to the disturbed area information in which the position of the rectangle area is shifted, in accordance with the position information o2, while in the modification of the first embodiment the image signal o1 is shifted before being coded.

To be specific, in the modification of the second embodiment, in order to obtain the same coding result as that obtained in the case where the position of the rectangle area on the object coordinate system is shifted in the direction and by the distance which are shown in the position information o2 and then the image signal corresponding to the rectangle area is subjected to inter-frame coding as in the modification of the first embodiment, the following two operations are required, i.e., the first operation of shifting the position of the reference image corresponding to each object by a degree equivalent to the position information o2, and the second operation of recording the decoded image signal corresponding to each object area in the memory 30 on the assumption that the rectangle area is shifted by a degree equivalent to the position information o2.

As described above, since the storage positions of the reference image and the image obtained by decoding are shifted each by a degree equivalent to the position information o2, the same coding result as that of the modification of the first embodiment is obtained.

Also in the modification of the second embodiment so constructed, the value of the position information o2 for shifting the rectangle area on the object coordinate system is changed frame by frame, and the image signal of each rectangle area in the frame to be processed is encoded with reference to the image signal of the corresponding rectangle area in the previous frame, and moreover, the storage positions of the reference image and the image obtained by decoding are shifted each by a degree equivalent to the position information o2. Therefore, like the modification of the first embodiment, even when a portion of the coded image signal corresponding to each object (a moving picture) is extracted from the multiplexed coded signal corresponding to the composite image and decoded, it is very difficult to display the normally moving image corresponding to each object.

Further, the multiplexed coded signal output from the image coding apparatus according to this modification of the second embodiment can be correctly decoded by an image decoding apparatus of the same structure as the conventional image decoding apparatus 200b which employs the object decoder O2a shown in FIG. 20.

[Embodiment 3]

Figure 7:
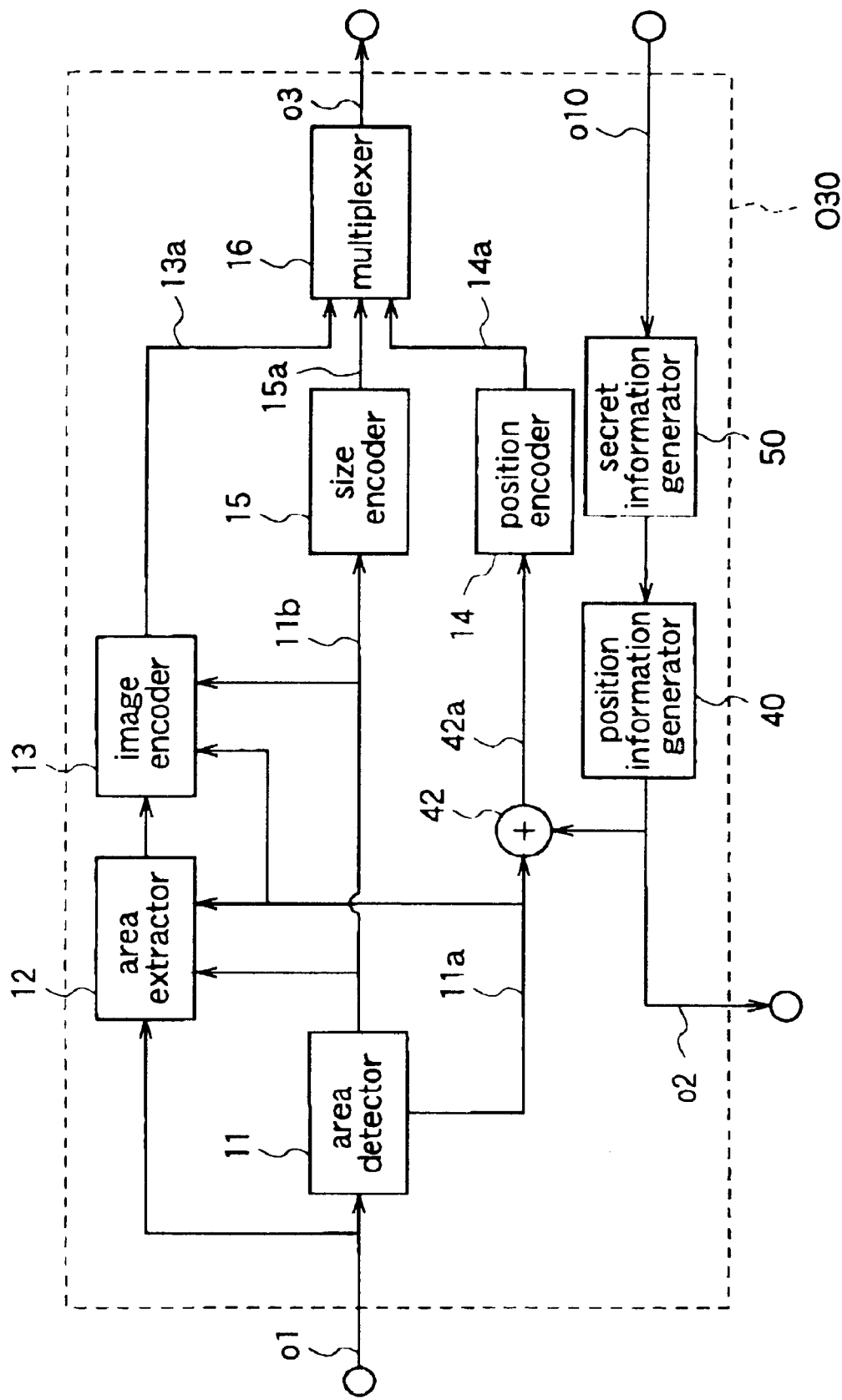
FIG. 7 is a block diagram for explaining an image coding apparatus according to a third embodiment of the invention, illustrating an object encoder which is a constituent of the image coding apparatus.

FIG. 7 is a block diagram for explaining an image coding apparatus according to a third embodiment of the present invention, illustrating an object encoder O30 as a constituent of the image coding apparatus.

The object encoder O30 according to this third embodiment has a secret information generator 50, in addition to the constituents of the object encoder O20 according to the second embodiment (see FIG. 5). The secret information generator 50 performs predetermined signal processing such as encryption or error correction on secret information o10 supplied from the outside, thereby generating data to be embedded in the position information o2. Further, the position information generator 40 generates the position information o2 in accordance with the output from the secret information generator 50.

Other constituents of the object encoder O30 are identical to those of the object encoder O20 of the second embodiment.

Next, the function and effect will be described.

In the object encoder O30 so constructed, the secret information o10 is converted to data to be embedded, which includes the secret information o10, by the secret information generator 50, and the data is input to the position information generator 40. In the position information generator 40, position information o2 is generated on the basis of the data to be embedded. Thereafter, a coding process using the position information o2 is carried out in the same manner as described for the second embodiment.

In this third embodiment, the following effects are obtained.

That is, the coding process where the secret information o10 is directly embedded in the position information o2 without being converted in the secret information generator 50, has the drawback that the embedded secret information is easily found out, and the image signal corresponding to each object is easily altered.

In contrast with this, in this third embodiment, the secret information o10 is converted to data to be embedded by subjecting the secret information o10 to signal processing, such as encryption or error correction, in the secret information generator 50, and this data is superposed on the position information o2, whereby extraction of the secret information becomes difficult and, further, the image signal corresponding to each object becomes highly resistant to alteration.

As described above, according to the third embodiment, the data which is obtained by performing signal processing such as encryption and error correction on the secret information o10 supplied from the outside, is embedded in the position information o2 to be superposed on the area position information and the coordinate position information. Therefore, as compared with the second embodiment, extraction of the secret information becomes more difficult, and reuse of the image information corresponding to each object becomes more difficult.

Further, the multiplexed coded signal output from the image coding apparatus of this third embodiment can be correctly decoded by an image decoding apparatus of the same structure as the conventional image decoding apparatus 200b shown in FIG. 17.

[Embodiment 4]

Figure 8:
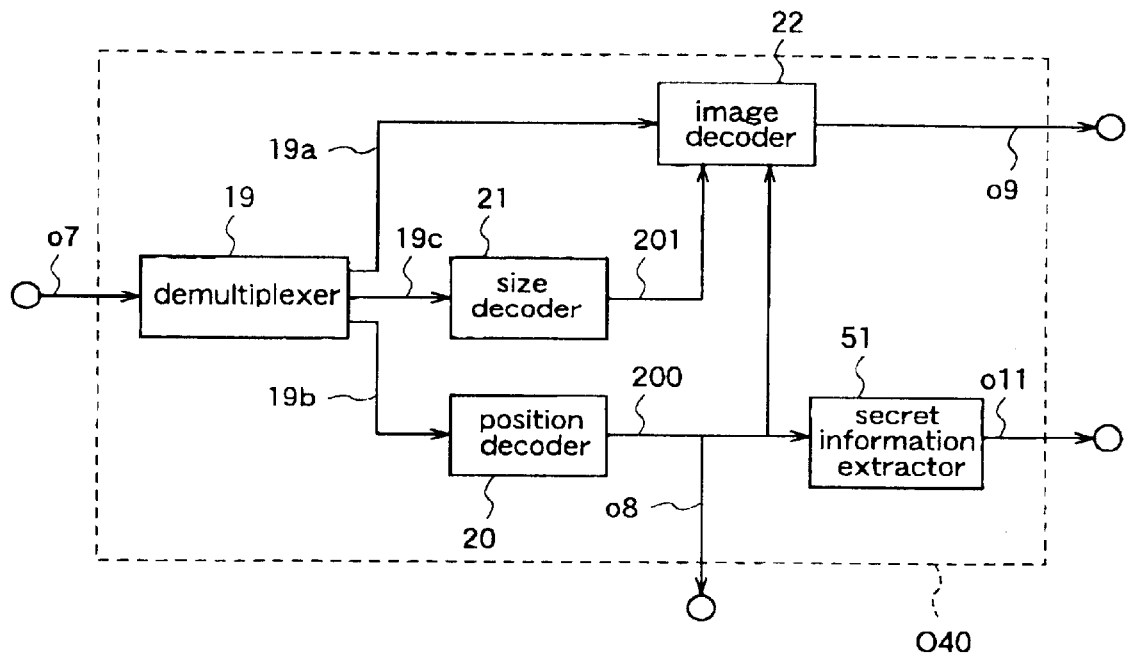
FIG. 8 is a block diagram for explaining an image decoding apparatus according to a fourth embodiment of the present invention, illustrating an object decoder which is a constituent of the image decoding apparatus.

FIG. 8 is a block diagram for explaining an image decoding apparatus according to a fourth embodiment of the present invention, illustrating an object decoder which is a constituent of the image decoding apparatus.

The image decoding apparatus of this fourth embodiment performs decoding on the multiplexed coded signal output from the image coding apparatus of the third embodiment, and it includes an object decoder O40 for decoding the coded object signal o7 from the object encoder O30 of the third embodiment, instead of the object decoder O2 (see FIG. 18) included in the conventional image decoding apparatus 200b shown in FIG. 17.

Figure 18:
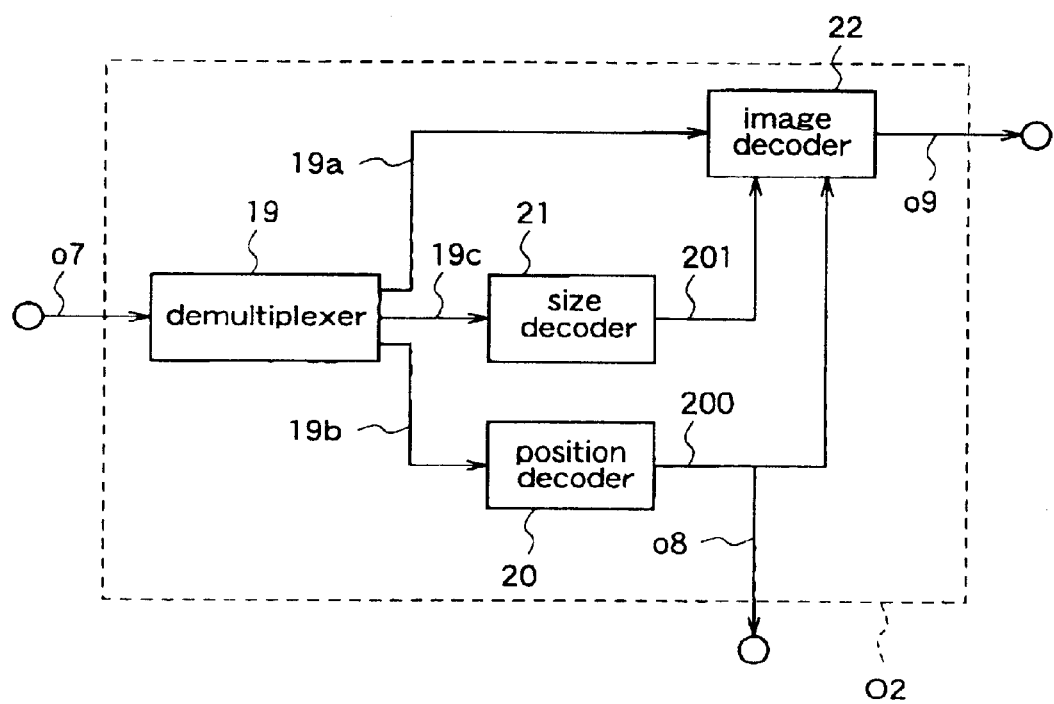
FIG. 18 is a block diagram for explaining an object decoder which is a constituent of the conventional image decoding apparatus.
Figure 19:
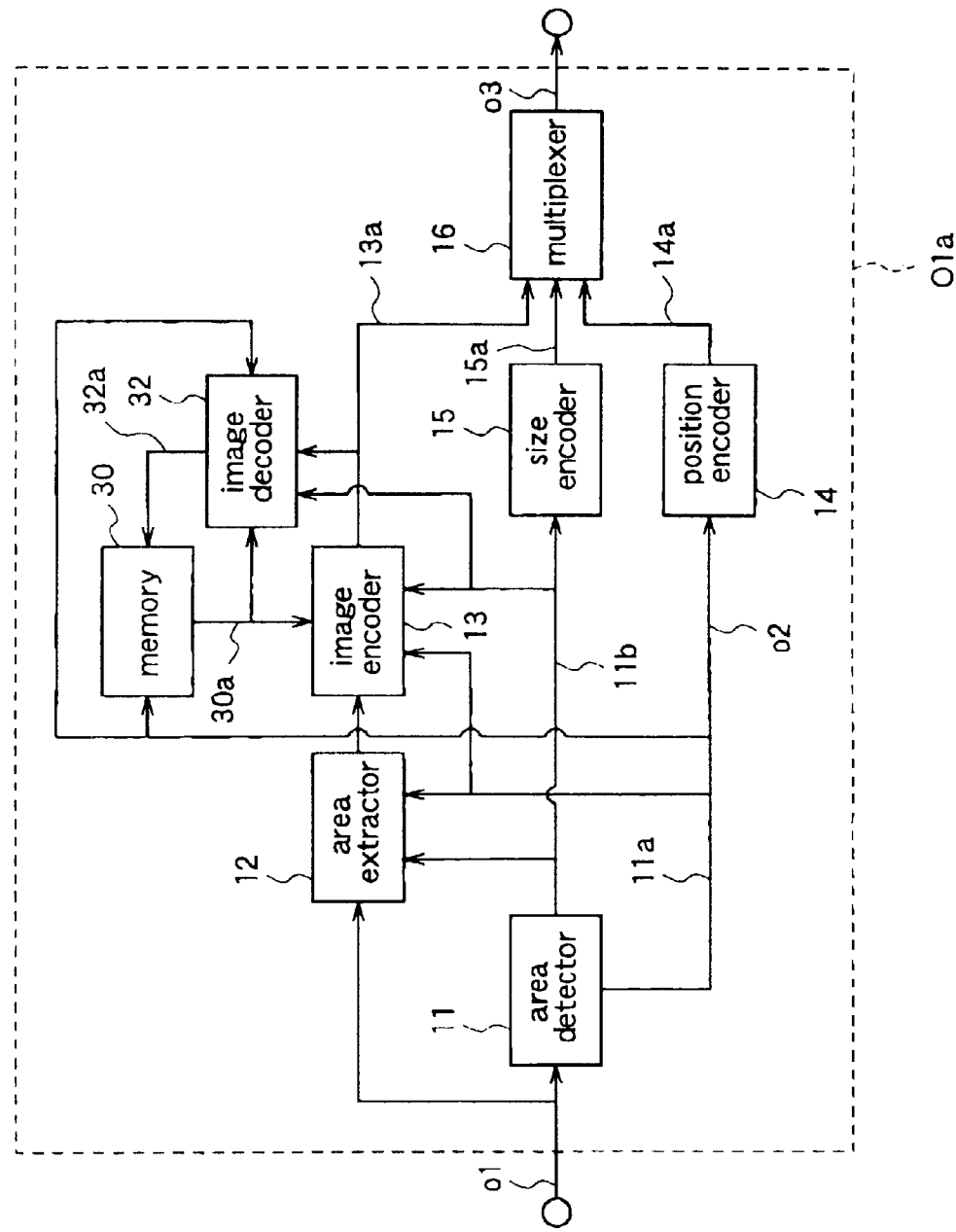
FIG. 19 is a block diagram illustrating other constituents of the conventional object encoder.

This object decoder O40 has a secret information extractor 51, in addition to the constituents of the object decoder O2 shown in FIG. 18. The secret information extractor 51 extracts the data embedded in the position information o8 from the position information o8 which is output from the position decoder 20, and analyzes the data to output secret information o11. Other constituents are identical to those of the conventional object decoder O2 shown in FIG. 18.

Next, the function and effect will be described.

In the object decoder O40 so constructed, the input coded object signal o7 is separated into coded signals corresponding to pixel value information, area position information (OBJpos), size information (OBJsize), by the demultiplexer 19. Then, coded signals 19b and 19c corresponding to the area position information and the size information are decoded by the position decoder 20 and the size decoder 21 to be output as area position information 200 and size information 201, respectively. Further, in the image decoder 22, the coded image signal corresponding to the rectangle area (BBOX) is decoded with reference to the area position information 200 and the size information 201, and a decoded object signal o9 is output.

At this time, the area position information 200 is output as position information o8 to the outside and, on the other hand, it is input to the secret information extractor 51.

In the secret information extractor 51, analysis of the position information o8 is performed, and the position information o8 is subjected to processes such as decryption, error detection, error correction, or the like. Thereby, the data embedded in the position information o8 is extracted as secret information o11.

In this fourth embodiment, the object decoder O40 is provided with the secret information extractor 51 which extract the embedded data from the position information o8 output from the position decoder 20, and analyzes the extracted data to output the secret information o11, in addition to the constituents of the object decoder shown in FIG. 18. Therefore, the multiplexed coded signal output from the image coding apparatus of the third embodiment is correctly decoded and, moreover, detection or extraction of the secret information which has been subjected to signal processing such as encryption can be performed by a relatively simple circuit structure in which only the secret information extractor 51 is added in the conventional object decoder.

[Embodiment 5]

Figure 9:
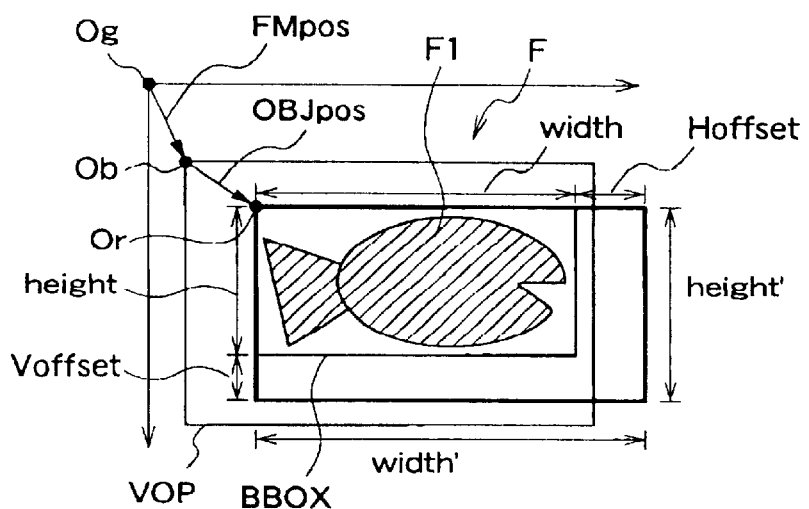
FIG. 9 is a schematic diagram for conceptually explaining a coding process according to a fifth embodiment of the invention.

FIG. 9 is a schematic diagram for conceptually explaining a coding process according to a fifth embodiment of the present invention.

While in the coding process of the third embodiment the secret information is superposed on the position disturbance information (pos offset), in the coding process of this fifth embodiment the secret information is superimposed on the size information (OBJsize) 11b output from the area detector 11.

To be specific, in the object-by-object coding process, the pixel values of pixels in a rectangle area (BBOX) containing an object are coded, the size of this rectangle area (BBOX) can be arbitrarily set as long as it contains the object.

So, instead of the size information (OBJsize) indicating the size (i.e., width and height) of the original rectangle area (BBOX), enlarged size information (OBJsize') indicating the size (width' and height') of a rectangle area (BBOX) which is obtained by superposing predetermined information on the size information (OBJsize) is encoded, whereby the values of the width (width') and the height (height') of the rectangle area can be made to have secret information.

For example, the remainders obtained when dividing the width (width') and the height (height') of the rectangle area by a numeric value K (e.g., the length of a side of a macroblock) are used as the secret information or data corresponding tothe secret information.

The relationship between the width and the height of the original rectangle area indicated by the size information (OBJsize) and the width' and the height' of the rectangle area indicated by the enlarged size information (OBJsize') satisfies the following formulae (3) and (4).

$$width'=width+Hoffset \quad (3)$$

$$height'=height+Voffset \quad (4)$$

where Hoffset and Voffset are arbitrary integers which are not negative.

Figure 10:
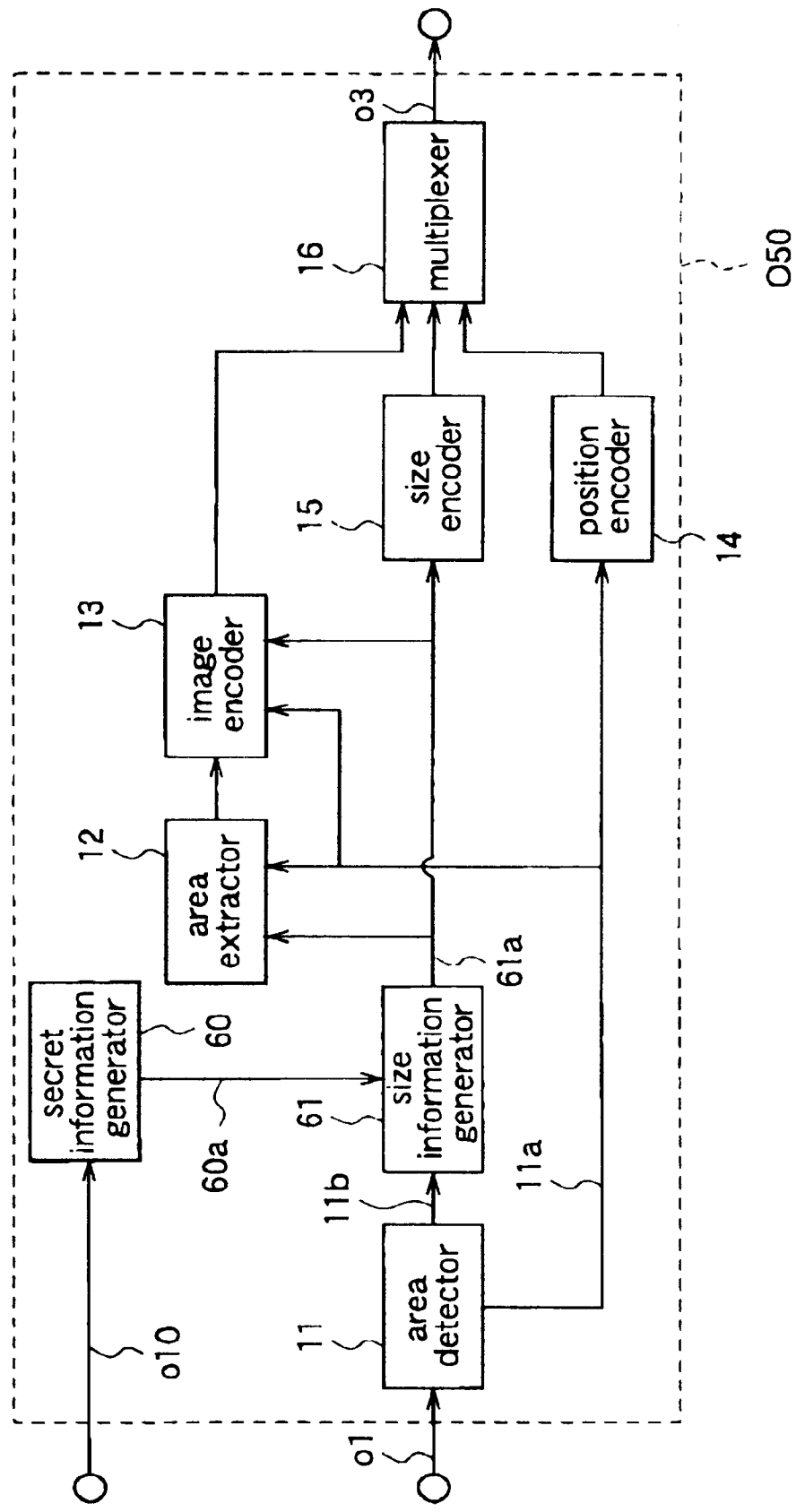
FIG. 10 is a block diagram for explaining an image coding apparatus according to the fifth embodiment, illustrating an object encoder which is a constituent of the image coding apparatus.

FIG. 10 is a block diagram for explaining an image coding apparatus according to the fifth embodiment, illustrating the structure of an object encoder O50 which is a constituent of the image coding apparatus.

Figure 16:
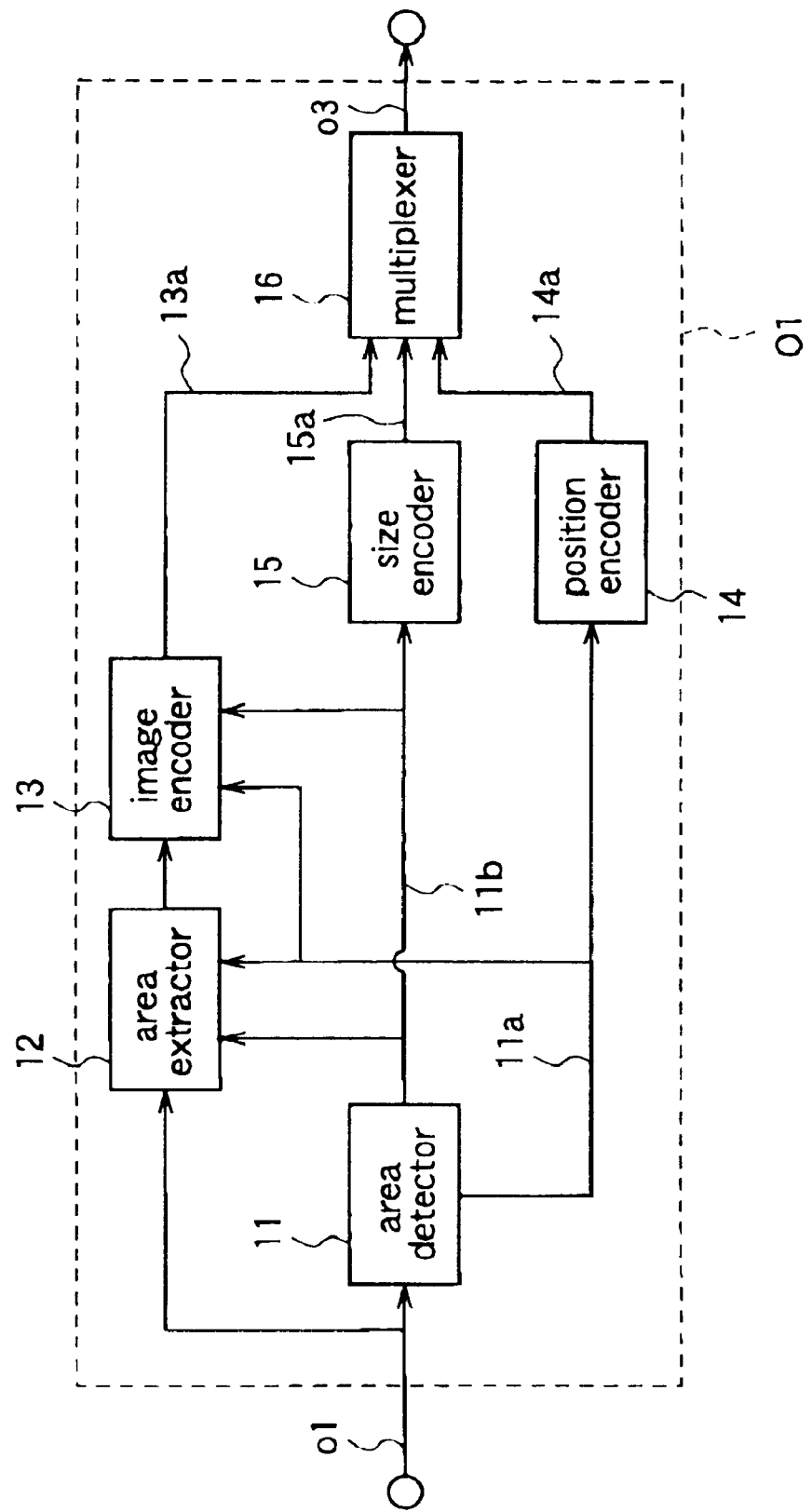
FIG. 16 is a block diagram for explaining an object encoder which is a constituent of the conventional image coding apparatus.

The object encoder O50 of this fifth embodiment has a secret information generator 60 and a size information generator 61, in addition to the constituents of the conventional object encoder O1 shown in FIG. 16. The secret information generator 60 performs predetermined signal processing on the secret information o10 supplied from the outside to generate data 60 to be embedded in the size information 11b output from the area detector 11. The size information generator 61 embeds the data 60a in the size information 11b output from the area detector 11 and outputs the enlarged sized information 61a. The enlarged size information 61a is encoded in the size encoder 15.

When the secret information is directly embedded in the size information without being converted in the secret information generator 60, the secret information is easily found out and altered. Therefore, in this fifth embodiment, the secret information is converted to data to be embedded, which has the ability of encryption or error correction, thereby making alteration or the like of the secret information more difficult.

Other constituents of the object encoder O50 are identical to those of the conventional object encoder O1.

Next, the function and effect will be described.

The secret information o10 supplied from the outside is input to the secret information generator 60, wherein the secret information o10 is subjected to signal processing, such as encryption or error correction, and converted to data 60a to be embedded, which includes the secret information.

On the other hand, in the area detector 11, the size of the rectangle area corresponding to each object and the position of the rectangle area in the object coordinate system are detected on the basis of the coded object signal o1 corresponding to the object, which is supplied from the outside, and the size and the position are output as the size information 11b and the position information 11a, respectively. Then, in the size information generator 61, the data 60a to be embedded is superposed on the size information 11b, and the enlarged size information 61a is output.

Then, in the area extractor 12, the pixel values of the rectangle area (BBOX) are extracted with reference to the area position information 11a and the enlarged size information 61a, and the extracted pixel values are encoded by the image encoder 13. At this time, the area position information 11a and the enlarged size information 61a are encoded by the position encoder 14 and the size encoder 15, respectively, and the outputs from the image encoder 13, the position encoder 14, and the size encoder 15 are multiplexed by the multiplexer 16 to be output as a coded object signal o3.

As described above, the object encoder O05 of this fifth embodiment is provided with the secret information generator 60 which converts the secret information o10 supplied from the outside to the data 60a to be embedded by subjecting it to predetermined signal processing, and the data 60a is embedded in the size information 11b of the rectangle area which is output from the area detector 11, thereby generating the enlarged size information 61a. Therefore, the secret information can be superposed on the coded object signal corresponding to each object without distorting the pixel values of the pixels in the rectangle area, whereby the secret information can be transmitted without degrading the image quality.

[Embodiment 6]

Figure 11:
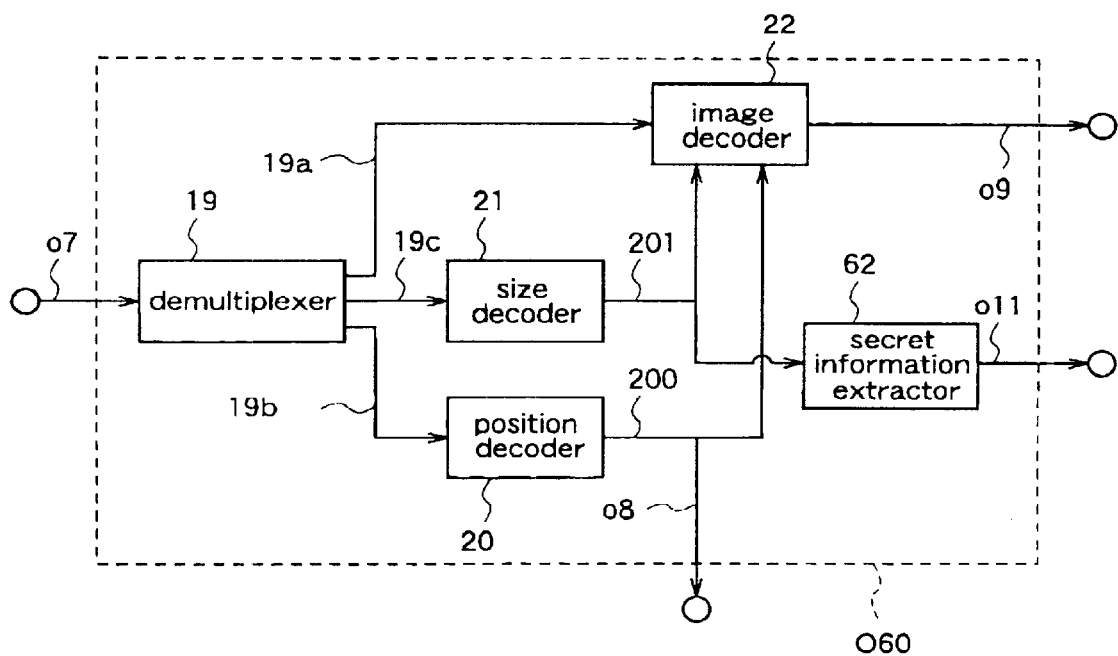
FIG. 11 is a block diagram for explaining an image decoding apparatus according to a sixth embodiment of the invention, illustrating an object decoder which is a constituent of the image decoding apparatus.

FIG. 11 is a block diagram for explaining an image decoding apparatus according to a sixth embodiment of the present invention, illustrating an object decoder which is a constituent of the image decoding apparatus.

The image decoding apparatus of this sixth embodiment performs decoding of the multiplexed coded signal from the image coding apparatus of the fifth embodiment, and it is provided with an object decoder O60 which decodes the coded object signal o7 corresponding to each object, which is obtained by demultiplexing the multiplexed coded signal, instead of the object decoder O2 (see FIG. 18) included in the conventional image decoding apparatus 200b shown in FIG. 17.

The object decoder O60 has secret information extractor 62, in addition to the constituents of the object decoder O2 shown in FIG. 18. The secret information extractor 62 receives the size information 201 which is output from the size decoder 21, and extracts the secret information o11 on the basis of the data embedded in the size information. Other constituents of the object decoder O60 are identical to those of the conventional object decoder O2 shown in FIG. 18.

In the subject decoder O60 so constructed, decoding of the coded object signal corresponding to each object is carried out in the same manner as described for the conventional object decoder O2. In this sixth embodiment, the size information 201 output from the size decoder 21 is analyzed in the secret information extractor 62. That is, the data embedded in the size information 201 is subjected to decryption, error detection, error correction, arid the like, whereby the secret information o11 is extracted.

As described above, the object decoder O60 of this sixth embodiment is provided with the secret information extractor 62 which receives the size information output from the size decoder 21 and extracts the secret information o11 on the basis of the data embedded in the size information. Therefore, the object decoder o60 can correctly decode the coded object signal from the object encoder of the fifth embodiment and, moreover, it can detect or extract the secret information included in the coded object signal corresponding to each object, by a relatively simple structure in which only the secret information extractor 62 is added to the conventional object decoder shown in FIG. 18.

When a coding or decoding program for implementing, by software, the image coding process or the image decoding process according to any of the aforementioned embodiments, is recorded on a storage medium such as a floppy disk, the process described in the embodiment can be easily executed in an independent computer system.

Figure 12:
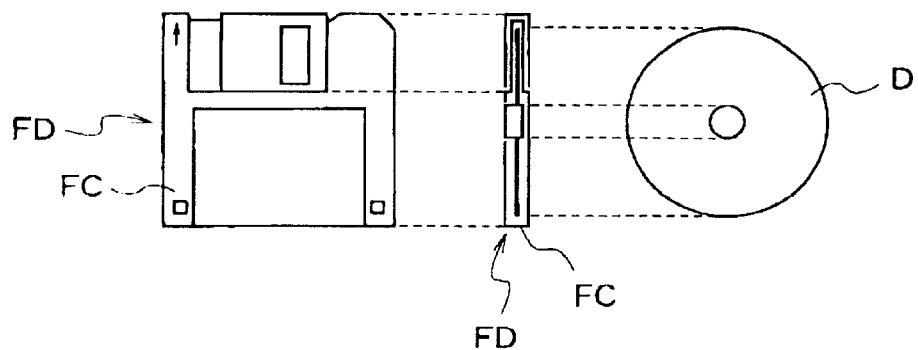
FIGS. 12(a) and 12(b) are diagrams for explaining a data storage medium which contains a program for implementing the coding process or the decoding process according to any of the aforementioned embodiments by using a computer system.
FIG. 12(c) is a diagram for explaining the computer system.
Figure 12:
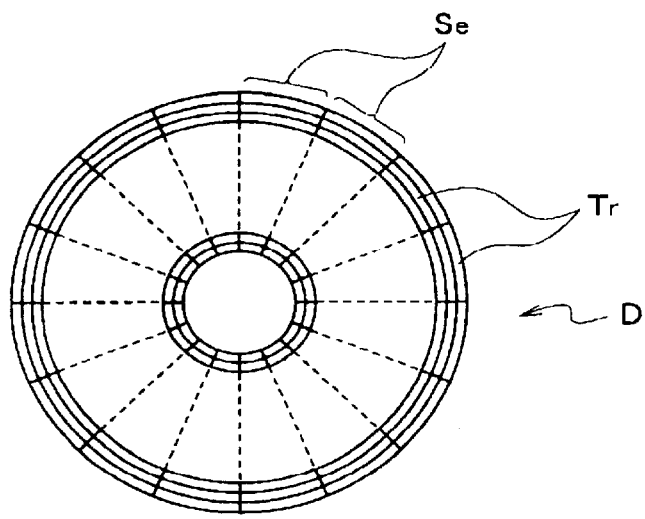
Figure 12:
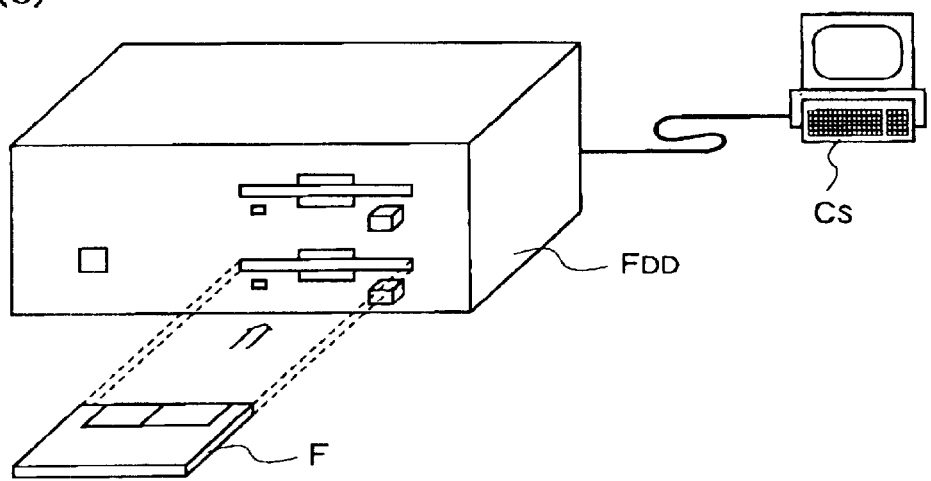

FIGS. 12(a)–12(c) are diagrams for explaining the case where the coding process or the decoding process according to any of the aforementioned embodiments is executed by a computer system using a floppy disk which contains the coding program or the decoding program.

FIG. 12(a) shows a front view of a floppy disk FD, a cross-sectional view thereof, and d floppy disk body D. FIG. 12(b) shows an example of a physical format of the floppy disk body D.

The floppy disk body D is contained in a floppy disk case FC, thereby providing the floppy disk FD. On the surface of the floppy disk body D, a plurality of tracks Tr are formed concentrically from the outer circumference of the disk toward the inner circumference. Each track Tr is divided into 16 sectors (Se) in the angular direction. Therefore, in the floppy disk FD containing the above-mentioned program, data as the program are recorded in the assigned sectors (Se) on the floppy disk body D.

FIG. 12(c) shows the structure for performing recording of the program in the floppy disk FD, and image processing by software using the program stored in the floppy disk FD.

To be specific, when the program is recorded in the floppy disk FD, the data as the program are read from the computer system Cs and written in the floppy disk FD through the floppy disk drive FDD. When the image coding apparatus or the image decoding apparatus is constructed in the computer system Cs according to the program recorded in the floppy disk FD, the program is read from the floppy disk FD by the floppy disk drive FDD and then loaded to the computer system Cs.

Although in the above description a floppy disk is employed as a data storage medium, even when an optical disk is employed, the coding process or the decoding process can be performed by software in the same manner as described for the floppy disk. Further, the data storage medium is not restricted to the floppy disk and the optical disk, other media may be employed as long as the program can be recorded therein, for example, an IC card or a ROM cassette may be employed. Also when using these data storage media, the coding process or the decoding process by software can be performed in the same manner as described for the floppy disk.

What is claimed is:

1. An image processing method for coding an image signal to display a predetermined composite image which comprises plural objects, said coding being performed for each of object areas which include the respective objects constituting the composite image, said method comprising the steps of:

adding position disturbance information for disturbing the position of each object area, to area position information which indicates the position of the object area in an individual coordinate system for processing the image signal of the object area, thereby generating disturbed area information, and subjecting the image signal corresponding to the object area to a coding process based on the individual coordinate system, in accordance with the area position information or the disturbed area information, thereby generating a coded image signal corresponding to the object area;

multiplexing a disturbed area signal obtained by coding the disturbed area information and the coded image signal corresponding to each object area, and outputting the multiplexed signal as a coded object signal for each object;

adding the position disturbance information to coordinate position information which indicates the positional relationship between a whole coordinate system for displaying the whole composite image and the individual coordinate system corresponding to each object area, such that the position of each object area, which moves in the individual coordinate system in accordance with the position disturbance information, becomes unchangeable in the whole coordinate system in spite of the position disturbance information, thereby generating disturbed coordinate information; and multiplexing a disturbed coordinate signal obtained by coding the disturbed coordinate information and the coded object signals corresponding to the respective objects to output a multiplexed coded signal.

2. An image processing method for decoding the multiplexed coded signal obtained by the image processing method of claim 1, comprising the steps of:

separating the multiplexed coded signal into the disturbed coordinate signal and the coded object signals corresponding to the respective objects, and separating each of the coded object signals into the disturbed area signal and the coded image signal;

decoding the disturbed area signal and the disturbed coordinate signal to generate the disturbed area information and the disturbed coordinate information, respectively;

subjecting the coded image signal corresponding to each object area to a decoding process based on the individual coordinate system, in accordance with the disturbed area information, thereby generating a decoded image signal corresponding to each object area; and subjecting the decoded image signals corresponding to the respective object areas to a composition process based on the whole coordinate system, in accordance with the disturbed coordinate information and the disturbed area information corresponding to the respective object areas, thereby generating the image signal corresponding to the composite image comprising the respective objects.

3. A data storage medium containing an image processing program, wherein said image processing program is a decoding program for making a computer perform a coded image signal decoding process according to the image processing method of claim 2.

4. The image processing method of claim 1 wherein said position disturbance information is generated so that it includes specific information which is input from the outside, in accordance with the specific information.

5. An image processing method for decoding the multiplexed coded signal obtained by the image processing method of claim 4, comprising the steps of:

separating the multiplexed coded signal into the disturbed coordinate signal and the coded object signals corresponding to the respective objects, and separating each of the coded object signal into the disturbed area signal and the coded image signal;

decoding the disturbed area signal and the disturbed coordinate signal to generate the disturbed area information and the disturbed coordinate information, respectively;

subjecting the coded image signal corresponding to each object area to a decoding process based on the individual coordinate system, in accordance with the disturbed area information, thereby generating a decoded image signal corresponding to each object area;

subjecting the decoded image signals corresponding to the respective object areas to a composition process based on the whole coordinate system, in accordance with the disturbed coordinate information and the disturbed area information corresponding to the respective object areas, thereby generating the image signal corresponding to the composite image comprising the respective objects; and extracting the specific information included in the position disturbance information, in accordance with the disturbed area information, and outputting the extracted specific information.

6. A data storage medium containing an image processing program, wherein said image processing program is a decoding program for making a computer perform a coded image signal decoding process according to the image processing method of claim 5.

7. A data storage medium containing an image processing program, wherein said image processing program is a coding program for making a computer perform an image signal coding process according to the image processing method of claim 4.

8. A data storage medium containing an image processing program, wherein said image processing program is a coding program for making a computer perform an image signal coding process according to the image processing method of claim 1.

* * * * *